US012241278B2

(12) United States Patent
Robert

(10) Patent No.: US 12,241,278 B2
(45) Date of Patent: Mar. 4, 2025

(54) PICK-RESISTANT LOCK ASSEMBLY

(71) Applicant: Michel Robert, Harvie Heights (CA)

(72) Inventor: Michel Robert, Harvie Heights (CA)

( * ) Notice: Subject to any disclaimer, the term of this patent is extended or adjusted under 35 U.S.C. 154(b) by 216 days.

(21) Appl. No.: 18/048,285

(22) Filed: Oct. 20, 2022

(65) Prior Publication Data

US 2023/0065524 A1 Mar. 2, 2023

Related U.S. Application Data

(63) Continuation of application No. PCT/CA2021/050535, filed on Apr. 20, 2021.

(60) Provisional application No. 63/015,017, filed on Apr. 24, 2020.

(51) Int. Cl.
*E05B 27/00* (2006.01)

(52) U.S. Cl.
CPC ...... *E05B 27/0057* (2013.01); *E05B 27/0017* (2013.01)

(58) Field of Classification Search
CPC .. E05B 27/00; E05B 27/0057; E05B 27/0017; E05B 27/0075; E05B 27/0064; E05B 27/0067; Y10T 70/7932
USPC .......................................... 70/419, 382–385
See application file for complete search history.

(56) References Cited

U.S. PATENT DOCUMENTS 1,565,556 A * 12/1925 Fremon ................ E05B 27/005 70/DIG. 5
2,113,007 A * 4/1938 Swanson .............. E05B 27/005 70/385
2,370,862 A 3/1945 Johnstone
3,494,158 A 2/1971 Bauer et al.
3,802,234 A 4/1974 Gerlach
3,857,263 A 12/1974 Gartner
4,078,406 A * 3/1978 Genakis ............... E05B 27/001 70/378
4,577,479 A 3/1986 Widen
(Continued)

FOREIGN PATENT DOCUMENTS

GB 2429235 A 2/2007
RU 2515519 3/1945
(Continued)

OTHER PUBLICATIONS

Extended European Search Report issued in European Patent Application No. 21792013.1, dated Apr. 4, 2024, 7 pages.
(Continued)

*Primary Examiner* — Suzanne L Barrett
(74) *Attorney, Agent, or Firm* — Heslin Rothenberg Farley & Mesiti P.C.

(57) ABSTRACT

A pick-resistant lock assembly is provided. The lock assembly includes a housing having a main bore and a chamber including a plurality of channels holding a corresponding plurality of pin stacks, a core having a keyway and having a plurality of core openings configured to align with the channels of the housing, and a sleeve configured to fit within the main bore. The pin stacks are each configured to provide a plurality of decoy shear lines in which rotation of the core and the sleeve together is limited by a blocking position and a true shear line which permits rotation of the core and the sleeve together for actuation of the lock assembly when the true shear line is provided in each pin stack of the plurality of pin stacks.

17 Claims, 21 Drawing Sheets

(56) References Cited

U.S. PATENT DOCUMENTS

| | | | | |
|---|---|---|---|---|
| 4,655,063 | A | 4/1987 | Foshee et al. | |
| 4,732,023 | A * | 3/1988 | Shen | E05B 27/005 70/378 |
| 4,836,002 | A * | 6/1989 | Monahan | E05B 27/005 70/385 |
| 4,856,309 | A | 8/1989 | Eizen | |
| 5,060,494 | A * | 10/1991 | Moorhouse | E05B 27/001 70/419 |
| 5,148,690 | A | 9/1992 | Wang | |
| 5,176,015 | A | 1/1993 | Sussina | |
| 5,799,519 | A * | 9/1998 | Hsiao | E05B 27/005 70/358 |
| 5,964,111 | A | 10/1999 | Lambert | |
| 6,397,649 | B1 | 6/2002 | Naber | |
| 6,910,356 | B2 * | 6/2005 | Price | E05B 15/1614 70/358 |
| 6,978,645 | B2 | 12/2005 | Shimon | |
| 6,978,647 | B2 | 12/2005 | Edwards, Jr. et al. | |
| 7,878,036 | B2 | 2/2011 | Armstrong et al. | |
| 9,181,728 | B2 | 11/2015 | Farag et al. | |
| 11,505,965 | B2 * | 11/2022 | Matlock | E05B 27/0053 |
| 2005/0183482 | A1 * | 8/2005 | Lin | E05B 27/005 70/383 |

FOREIGN PATENT DOCUMENTS

| | | |
|---|---|---|
| WO | 2008069683 | 6/2008 |
| WO | 2014089141 | 6/2014 |

OTHER PUBLICATIONS

International Search Report and Written Opinion of the International Searching Authority for PCT/CA2021/050535, Jul. 13, 2021, 9 pages.

* cited by examiner

PROPER PIN HEIGHT ATTAINED BY TRUE KEY
& CORE ROTATED CLOCKWISE FROM FIG. 21

CORE ROTATED CLOCKWISE FROM FIG. 21

PICK-RESISTANT LOCK ASSEMBLY

CROSS REFERENCE TO RELATED APPLICATIONS

This application is a Bypass Continuation Application to PCT International Application No. PCT/CA2021/050535, filed Apr. 20, 2021, and entitled "Pick-Resistant Lock Assembly", which claims priority benefit under 35 U.S.C. § 119(e) of U.S. Provisional Patent Application No. 63/015,017, filed Apr. 24, 2020, both applications and the disclosures of each are hereby incorporated herein by reference in their entirety.

FIELD OF THE INVENTION

The technology described herein relates generally to lock assemblies having enhanced security features and provides a pick-resistant lock assembly constructed with minimal specialized components.

BACKGROUND OF THE INVENTION

Pin tumbler lock cylinders are susceptible to attacks by picking or bumping. In a picking attack, a first tool or torque wrench is inserted into the plug assembly keyway and a small threshold rotational torque is applied and held. A second tool or pick is inserted in the keyway and manipulated to successively move the key followers and associated cylinder pins so that the cylinder pins rise above the shear line between the cylinder body and plug assembly. The torque on the plug assembly will cause a slight misalignment of the respective key follower and cylinder pin bores, which will prevent the cylinder pins from falling back down across the shear line. During this process, the attacker must sense by feel, the cylinder pin rising above the shear line and the amount the plug rotates, and apply greater or lesser torque to keep the "set" of the picked pins while feeling for the next pin's relationship to the shear line. Other types of attacks use tools such as a snap gun, an electro-pick or a rake.

In a bumping attack, the attacker inserts a special "bump" key into the keyway and applies a threshold rotational torque. Then the attacker applies at least one axial blow to the bump key. This shock causes the cylinder pins to jump above the shear line; as the pins rise, they separate as the shock is transferred from the bottom pin to the top pin, and the applied torque will turn the plug assembly before the cylinder pins can be driven back into place by their respective springs. However, too much applied torque will "crush" a cylinder pin at the shear line, which will then absorb the shock of the applied axial blow, and the cylinder pins won't jump. Another form of attack is to "impression" the lock mechanism.

The common denominator in these types of attacks is applying, maintaining and modulating a rotational torque to the plug assembly and sensing it throughout the process.

A number of lock assemblies have been designed with an aim to preventing such attacks, some examples of which are described in PCT Publication Nos. WO2008069683A1 and WO2014089141A1, U.S. Pat. Nos. 6,397,649, 4,577,479, 4,856,309, 7,878,036, 3,857,263, 5,964,111, 5,148,690, 4,655,063, and 6,978,645, Russian Patent RU2515519C1, and UK Patent Publication No. GB2429235A, each of which is incorporated herein by reference in its entirety.

There continues to be a need for development of enhanced security pick-resistant lock assemblies.

SUMMARY OF THE INVENTION

According to one embodiment, there is provided a pick-resistant lock assembly. The assembly includes a housing having a main bore and a chamber including a plurality of channels holding a corresponding plurality of pin stacks, a core having a keyway and having a plurality of core openings configured to align with the channels of the housing and a sleeve defined a sleeve bore to accept the core. The sleeve has a plurality of sleeve openings configured to align with the core openings and the channels. The sleeve is configured to fit within the main bore. The lock assembly includes a true key configured for insertion into the keyway to rotate the core and the sleeve together for actuation of the lock assembly.

The pin stacks may be each configured to provide (i) a plurality of decoy shear lines in which rotation of the core and the sleeve together is limited by a blocking position provided by the pin stacks, and (ii) a true shear line which permits rotation of the core and the sleeve together for actuation of the lock assembly when the true shear line is provided in each pin stack of the plurality of pin stacks. The true shear line is provided by elevation of each pin stack of the plurality of pin stacks by the true key being inserted into the keyway.

The plurality of pin stacks may each include a plurality of wafers. The core may be shaped to include at least one wafer receiver adjacent to at least some of the core openings. The wafer receiver may be configured to remove one or more of a plurality of wafers from a corresponding pin stack of the plurality of pin stacks when the core is rotated.

A plurality of wafer receivers may be located adjacent to each core opening of the plurality of core openings. The plurality of wafer receivers may be located on each side of the core openings.

The wafer receivers may be in the shape of laterally extending grooves formed directly adjacent to the core openings.

The plurality of wafers in each pin stack of the plurality of pin stacks may include a shear wafer having a different shape or a different height dimension than remaining wafers of the plurality of wafers. In this arrangement, the true shear line is provided when the shear wafer is removed from the pin stack upon rotation of the core.

The plurality of wafer receivers may be in the form of shaped indentations spaced apart from the core openings. The shaped indentations may be configured to receive only the shear wafer.

The shear wafer may be shaped to have a protruding surface complementary to the shaped indentations. The protruding surface may be conical.

The plurality of channels may be five channels holding five pin stacks. The plurality of pin stacks may each include six thin wafers, one shear wafer, and one key pin. The key pin may be selected from a set of two key pins having different height dimensions.

The true shear line may be configured to place a top surface of the shear wafer at a level substantially equivalent to the level of the outer surface of the sleeve, thereby permitting rotation of the core and sleeve together.

The core may have a lock pin groove at an end of the plurality of core openings. The lock pin groove is separated from the keyway and may have an inner cam surface permitting a lock pin residing in the lock pin groove to move out of the lock pin groove when full rotation of the sleeve is permitted.

BRIEF DESCRIPTION OF THE DRAWINGS

The accompanying drawings, which are incorporated in and constitute a part of the specification, illustrate embodiments of the invention and together with the detailed description herein, serve to explain the principles of the invention. The drawings are only for purposes of illustrating preferred embodiments and are not to be construed as limiting the invention. It is emphasized that, in accordance with the standard practice in the industry, various features are not drawn to scale. In fact, the dimensions of the various features may be arbitrarily increased or reduced for clarity of discussion. The foregoing and other objects, features and advantages of the invention are apparent from the following detailed description taken in conjunction with the accompanying drawings in which.

DETAILED DESCRIPTION FOR CARRYING OUT THE INVENTION

There have been many attempts over the last century to make pin tumbler locks unpickable. As used herein, the term "picking" refers to manipulation of pins in a lock assembly to actuate the lock assembly without using its matched key (or true key). Some locks remained unpicked for a period of time, but eventually, every design has been picked. Almost every "high security" or "pick-resistant" lock designer has increased the security of locks by adding more and more complicated elements (such as such as sidebars, security pins, and pins in different orientations) to their locks increasing the cost of production and difficulty in servicing these locks by trade professionals, even requiring locksmiths to purchase specialized equipment and parts to be able to service the locks. With the addition of more security features, complications are introduced which add to the number of elements that need to be manipulated in order to operate the locks and adding extra costs to the end user.

Figure 1:
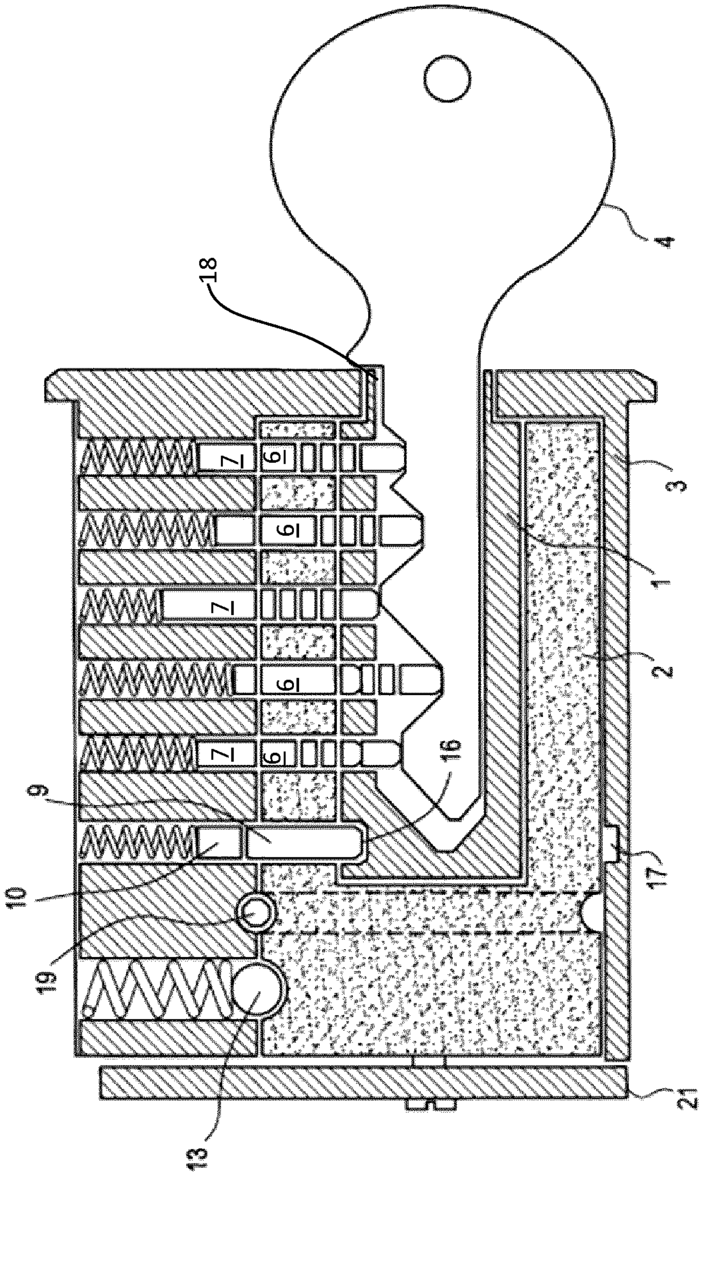
Fig. 1 (PRIOR ART)
FIG. 1 is a cross-sectional view of one example of a pick-resistant lock assembly known in the prior art, in accordance with an aspect of the present disclosure.

In one prior art example described in U.S. Pat. No. 5,964,111 (incorporated herein by reference in its entirety), there is a conventional pick-resistant lock assembly with an intermediary cylinder between the cylinder of the lock, which is in direct contact with the key, and the outer housing of the lock to provide a shield to separate the rotating function of the first cylinder from the "picking" or pin stack manipulation process. This lock assembly is shown in FIG. 1, where it is seen that upon inserting a key 4 into the keyway 18 of the inner cylinder 1, the pin stacks either are or are not raised to the proper levels at that time, depending upon whether the correct cut depths are present on the key 4. The inner cylinder 1 must then be rotated by an amount that allows a cam pin stack formed of pins 9 and 10 to drop down on one side or the other of the pin cam 16 groove, at which time the shear line between parts 9 and 10 will allow cylinder 2 to rotate within the housing 3. The bottom cam pin 9 will then also become connective between the inner cylinder 1 and the intermediate cylinder 2 which then allows the key 4 to also rotate cylinder 2 as it further rotates inner cylinder 1. Even if the wrong key has been inserted, the inner cylinder 1 will rotate to this point because of a multitude of pins (known in the trade as master pins) in each pin stack area that comprises what is known as the bottom of the pin stacks. But since it is the shear line between the intermediate pins 6 and the top pins 7 that determines whether the intermediate cylinder 2 can be rotated, if the wrong key has been inserted it will not be discovered until after inner cylinder 1 has been rotated beyond the point where any pins in any of the stacks can be further manipulated. If the correct key 4 is being used, then further rotating of inner cylinder 1 pushes upon the side of the bottom cam pin 9, which itself conveys that force to rotate the intermediate cylinder 2, and, since all the shear lines between the pins 6 and 7 are now properly aligned, cylinder 2 will rotate further. While this particular lock assembly provided additional security relative to conventional lock assemblies, shortcomings in its construction were recognized by the present inventor. For example, this lock assembly is susceptible to over-lifting during picking attempts and its construction cannot be easily scaled down to fit existing door hardware, such as key-in-knob arrangements, key-in-lever arrangements and padlocks. The present inventor has also recognized that multiple operating shearlines in one cylinder can be accidently created during the manufacturing or pinning of this lock assembly and that the shearline can still be detected by skilled lockpickers because the true shearline can be achieved with the core in its resting position.

To address these and other shortcomings of conventional pick-resistant lock assemblies, the present inventor has conceived of an alternative arrangement for increasing the number of shear lines in a lock assembly that can be achieved during manipulation of the locking elements while configuring only one operable shearline capable of operating an associated lock actuator. The provision of many "decoy" shearlines will cause an attempt at picking the lock to generate a shearline which will allow rotation of an inner core without rotating an outer sleeve which actuates the lock. In exemplary embodiments described hereinbelow, a five pin lock will provide 32,768 possible shearlines with only one being operable to rotate the outer core to actuate the lock. Therefore, while it is possible that the lock assembly of this particular embodiment may be picked, the odds of successfully doing so is 1 in 32,768 possible attempts. It would therefore require an inordinate and unreasonable number of attempts for a skilled lock picker to be successful.

Embodiments of the present lock assembly make it essentially impossible for someone attempting to pick the lock to have control over the tension on the core in order to manipulate each pin stack at a time and verify that setting. The configurations of the pin stacks make it impossible for an over-lift attack to be successful. The example embodiment described herein has minimal customized components and this will significantly simplify the re-keying processes performed by locksmiths and eliminate the chances of accidently introducing multiple operating shearlines, as well as reducing the manufacturing cost. The configurations of pin stacks will make it possible for key cutters to use their existing machines to copy/cut keys for the end user by utilizing cut depths and key codes that manufacturers are already using.

A first example embodiment will now be described with reference to FIGS. 2 to 14. For the purposes of illustration, components depicted in the FIGS. are not necessarily drawn to scale in all cases. Emphasis is placed on highlighting the various contributions of the components to the functionality of this embodiment and alternative embodiments. Alternative features are introduced during the course of this description. It is to be understood that, according to the knowledge and judgment of persons skilled in the art, such alternative features may be substituted in various combinations to arrive at different embodiments of the present technology.

Figure 3:
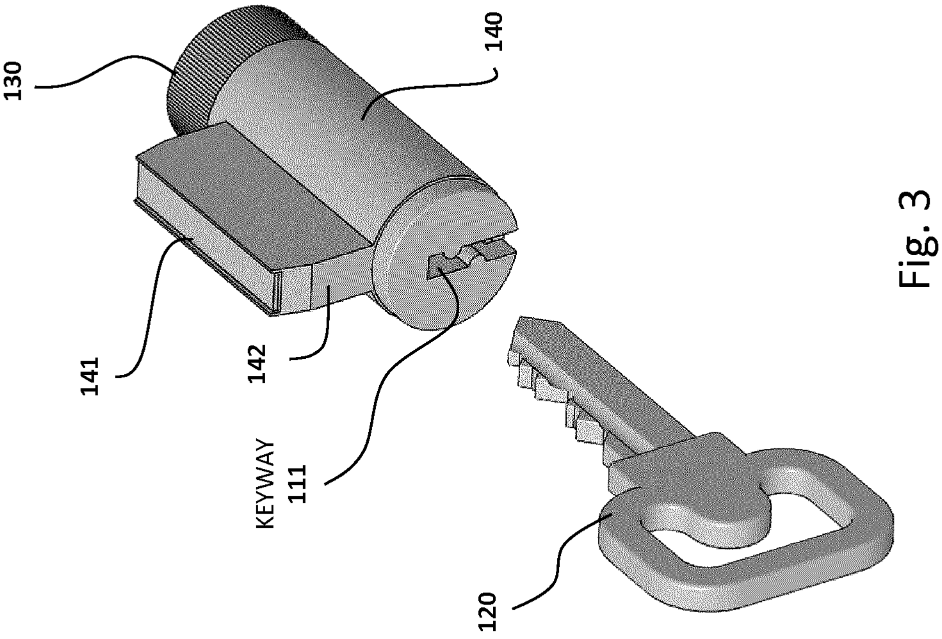
FIG. 3 is a perspective view of the assembly as shown in FIG. 1 with a key removed from a keyway in a core of the assembly in accordance with an aspect of the present disclosure.
Figure 2:
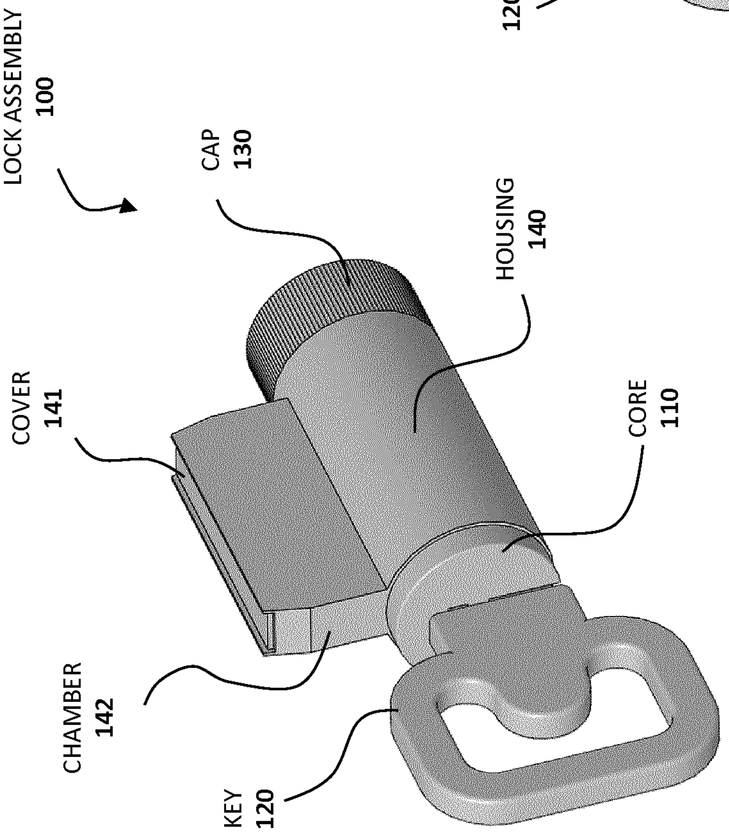
FIG. 2 is a perspective view of one embodiment of a lock assembly in accordance with an aspect of the present disclosure.

In FIGS. 2 to 14, there is shown a first example embodiment of a pick-resistant lock assembly 100 developed by the present inventor. FIG. 2 shows the lock assembly 100 with a key 120 inserted into the core via a keyway (see in FIG. 3). The core 110 is covered with a housing 140. The housing 140 includes an upper chamber 142 for holding pin stacks 160 (not visible in FIG. 2 but seen in FIGS. 4-6, 9 and 10). A cover 141 is provided above the pin channels 144 (see FIGS. 4 and 5) which are located inside the chamber 142. In FIG. 3, the key 120 is removed, exposing a keyway 111.

Figure 4:
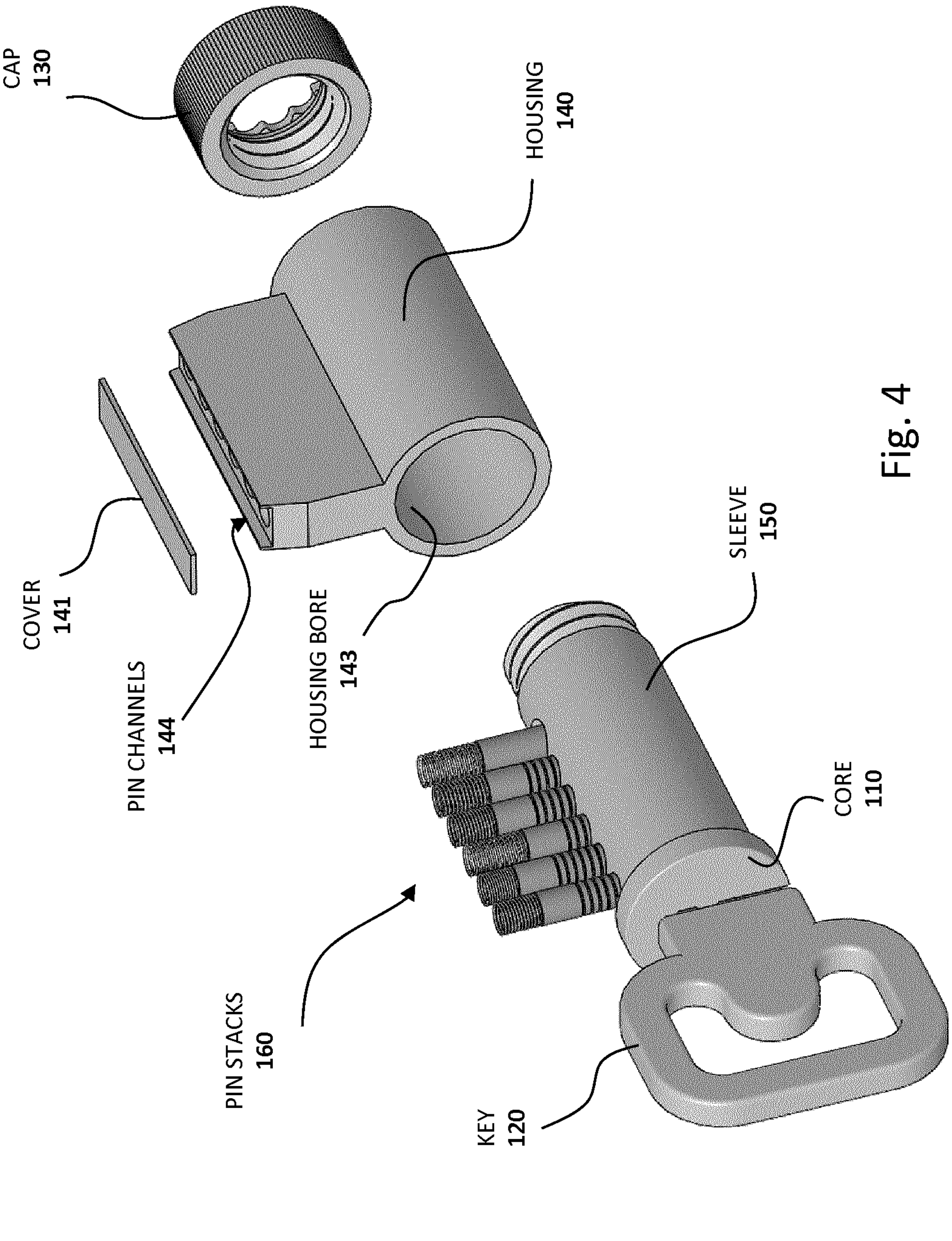
FIG. 4 is a partially exploded perspective view of the assembly, in accordance with an aspect of the present disclosure.

The partially exploded view shown in FIG. 4 has the housing 140 and cap 130 removed to expose an inner sleeve 150. The cap 130 serves as a base for attachment of an actuator which operates a bolt or latch (not shown). During construction of the lock assembly 100, the core 110 is inserted into the sleeve 150 and then the sleeve 150 is inserted into the main housing bore 143, followed by threading the cap 130 onto the exposed end of the sleeve 150. Then the pin stacks 160 are placed in the pin channels 144 of the chamber 142. This is followed by installation of the cover 141. The components and function of the pin stacks 160 will be described in more detail hereinbelow.

Figure 5:
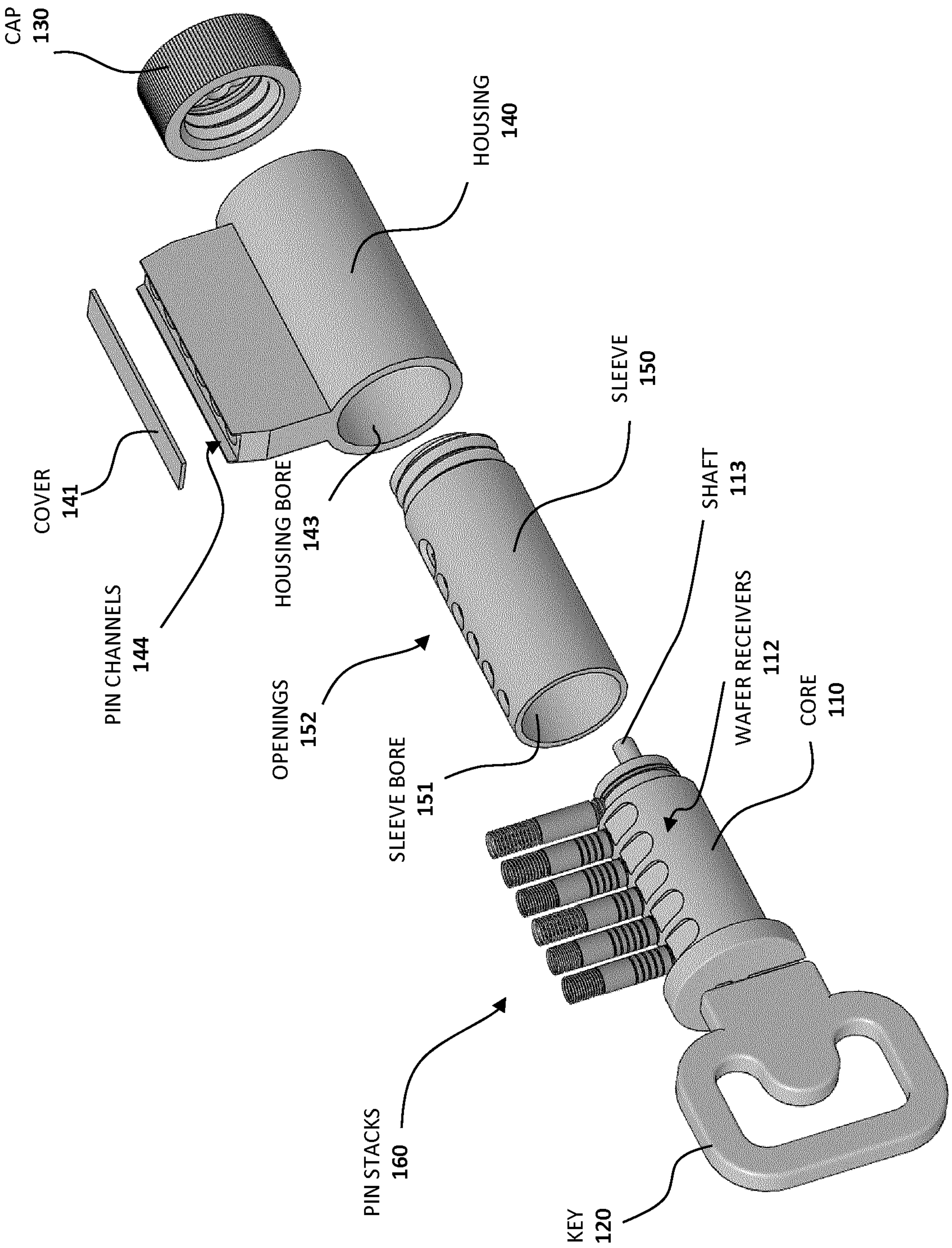
FIG. 5 is another partially exploded perspective view of the assembly showing separation of a sleeve component from the core component, in accordance with an aspect of the present disclosure.

The exploded view of FIG. 5 has the sleeve 150 separated from the core 110 to show that the sleeve has a bore 151 and a series of upper openings 152 of which the five-leftmost openings align with the pin channels 144 of the chamber when the assembly 100 is formed. FIG. 5 also indicates that the rightmost pin stack is different from the others, including only two parts which are shown in more detail in FIG. 9.

Figure 6:
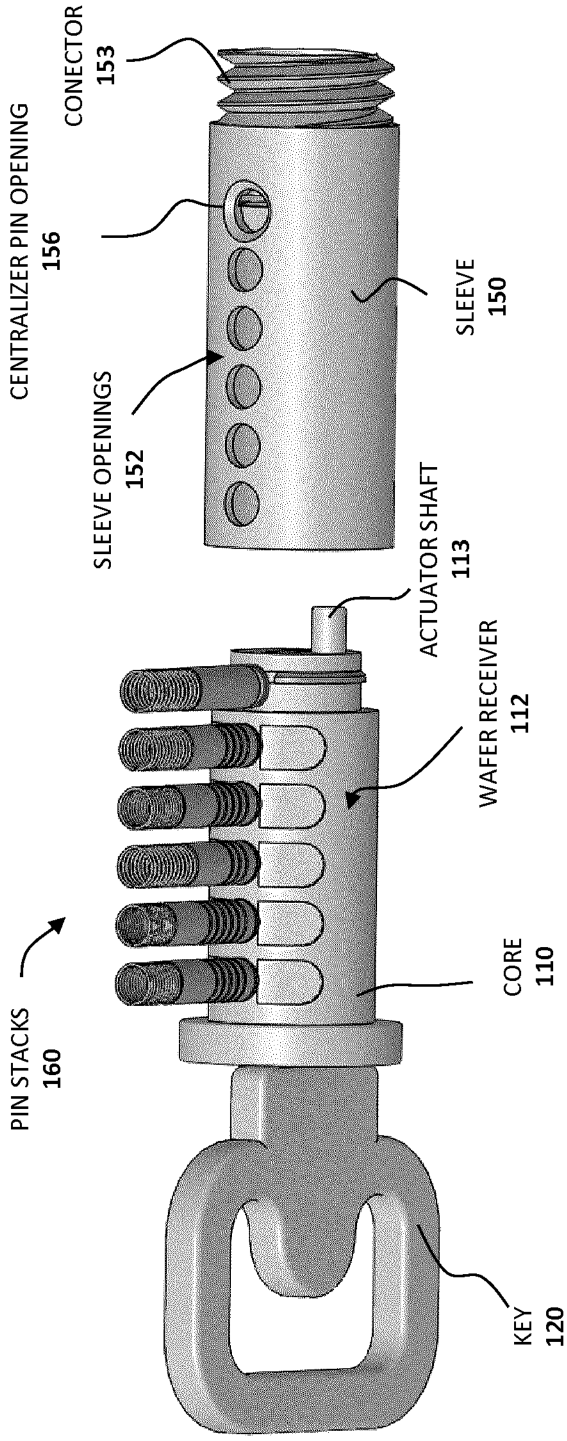
FIG. 6 is another partially exploded top perspective view of the assembly showing features of the sleeve, in accordance with an aspect of the present disclosure.

Turning now to FIG. 6, there is shown a top perspective exploded view of part of the lock assembly 100 with the sleeve 150 removed from the core 110 to show that the five leftmost sleeve openings 152 differ from the rightmost centralizer pin opening 156, which includes a beveled edge. It is also seen in FIG. 6 that the sleeve 152 has a threaded connector 153 which is used to install the cap 130.

Figure 7:
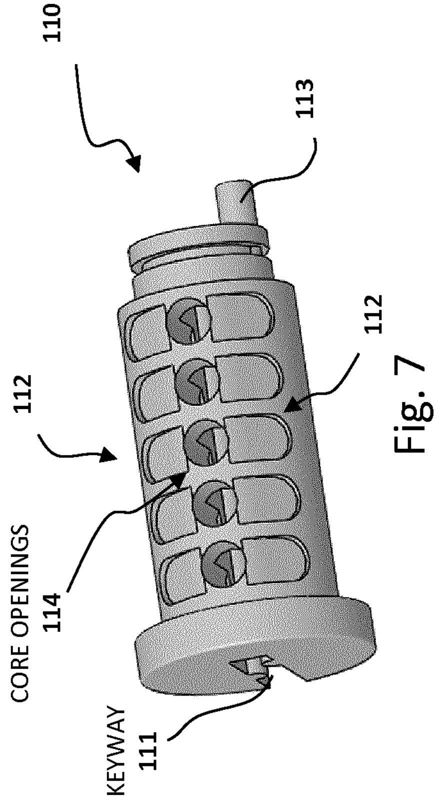
FIG. 7 is a perspective view of the core by itself, showing opposed wafer receivers on either side of five core openings, in accordance with an aspect of the present disclosure.

FIG. 7 shows the core 110 by itself, indicating that it includes five core openings 114 for retaining portions of the pin stacks 160 (which are seen in FIG. 6 but omitted in FIG. 7). It is to be understood that each pin stack 160 is placed in a corresponding channel of the pin channels 144 in the chamber 142 of the housing 140. The pin channels 144 are aligned with the openings 152 in the sleeve 150 and the core openings 114 such that when the pin stacks 160 are dropped into the pin channels 144, they will drop down into the keyway 111 of the core 110. FIG. 7 also shows that core wafer receivers 112 in the form of laterally extending grooves are provided on each side of each of the core openings 114. The functionality of the core wafer receivers 112 will be described in more detail hereinbelow. While this embodiment 100 has two opposed wafer receivers 112, alternative embodiments may be constructed with only one wafer receiver 112 on either side of each of the openings 114.

Figure 8:
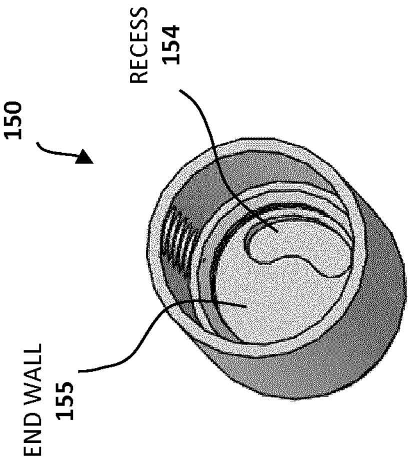
FIG. 8 is a perspective view of an open end of the sleeve showing a recess in an opposing end wall, in accordance with an aspect of the present disclosure.

FIG. 8 is an end view of the sleeve 150 from its open end, indicating that the opposing end is closed with an end wall 155. The end wall 155 has a shaped recess 154 formed therein. This recess 154 is provided to accept the end of an actuator shaft 113 which extends from an end of the core 110 (see FIGS. 6 and 7). The function of the actuator shaft 113 and recess 154 will be described in more detail hereinbelow during a description of operation of the lock assembly 100.

Figure 9:
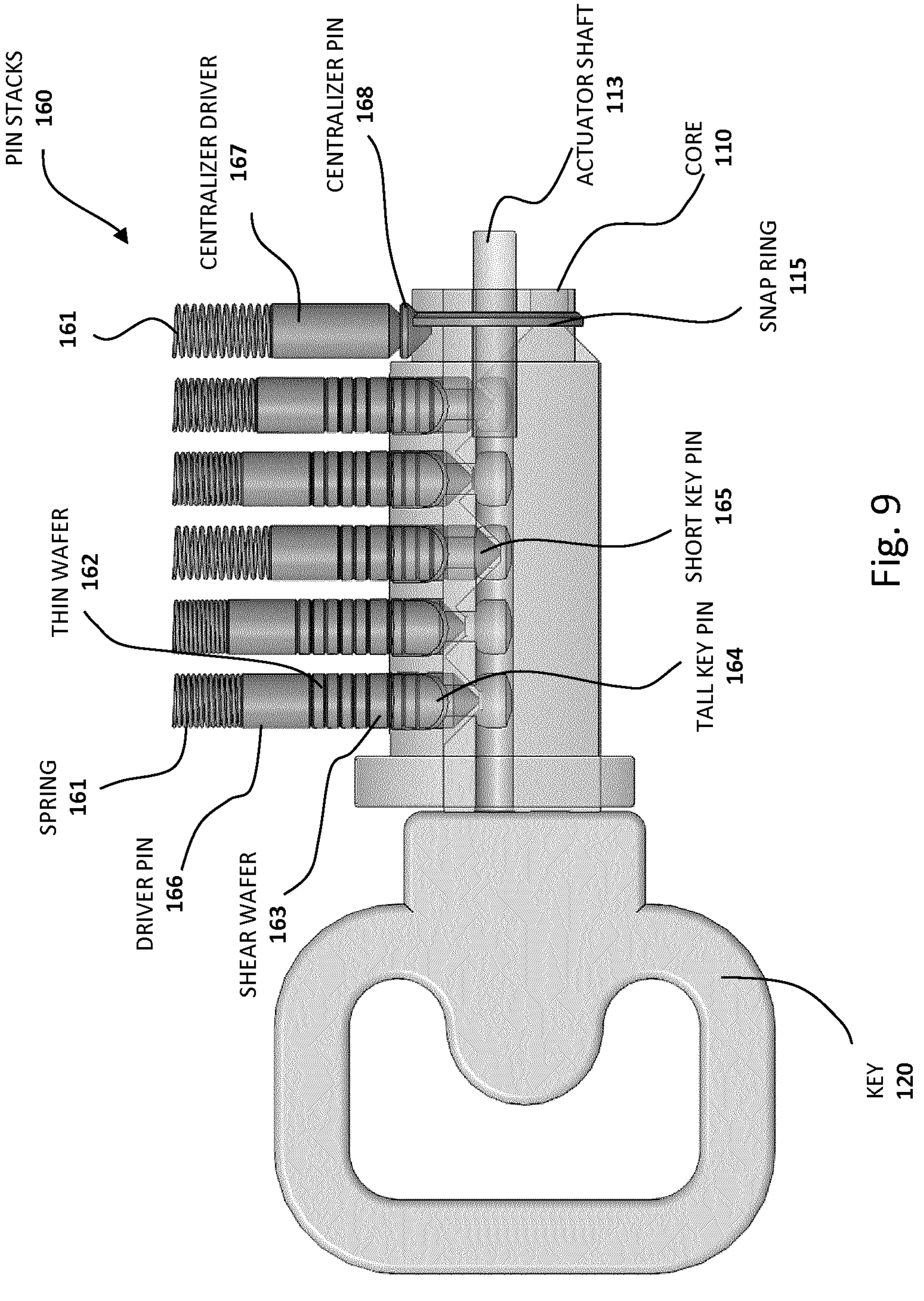
FIG. 9 is a side elevation view showing the key inserted into the core with the core shown in a transparent view, indicating elevation of each of five pin stacks by the various levels of the key to the true shear line extending below a shear wafer of each of the five pin stacks, in accordance with an aspect of the present disclosure.

FIG. 9 is a side elevation view of selected components of the lock assembly 100 with the key 120 inserted into the core 110. The core 110 is shown as transparent in order to visualize the key shaft which has portions of different levels to elevate each of the pin stacks 160 to different levels. Each of the pin stacks 160 includes a spring 161 which pushes against the cover 141 of the housing 140 (the cover 141 is not shown in FIG. 9 in an effort to preserve clarity). Each of the pin stacks 160 includes a spring 161, a driver pin 166, one or more thin wafers 162 located above and below a thicker shear wafer 163 (which in this embodiment has a height dimension greater than the height of the thin wafers 162), and either a tall key pin 164 or a short key pin 165 which is brought into contact with one of the levels of the shaft of the key 120 when the key 120 is inserted into the keyway 111 (the five different levels may be identified by the vertex of each of the five key pins 164, 165, which makes contact with the key shaft). The rightmost pin stack 160 has a top-to-bottom arrangement including a spring 161, a centralizer driver 167 and a generally frustoconical centralizer pin 168 which drops into the centralizer pin opening 156 in the sleeve 150 (see FIG. 6). The centralizer pin 168 is held in place by a gap in a snap ring 115 which is held in a groove in a reduced diameter portion of the core 110 from which the actuator shaft 113 extends. The centralizer pin 168 therefore does not make contact with any surface of the key 120 and does not play a role in actuation of the lock assembly 100. Instead, the centralizer pin 168 serves to prevent undesirable rotation of the core 110 away from a centralized resting position wherein the keyway 111 is vertically disposed.

It is to be understood from FIG. 9 that the true key 120 is configured to actuate the lock mechanism of the lock assembly 100. This is accomplished by elevating the pin stacks 160 to provide a true shear line which will permit actuation of the lock mechanism. The true shear line follows a gap between the bottom of each shear wafer 163 and the outer surface of one of the wafer receivers 112 formed in the outer sidewall of the core 110 as will be described in more detail hereinbelow. In FIG. 9, it is to be noted that the bottom of each shear wafer 163 of each pin stack 160 is generally aligned with the upper outer surface of the core 110.

Figure 10:
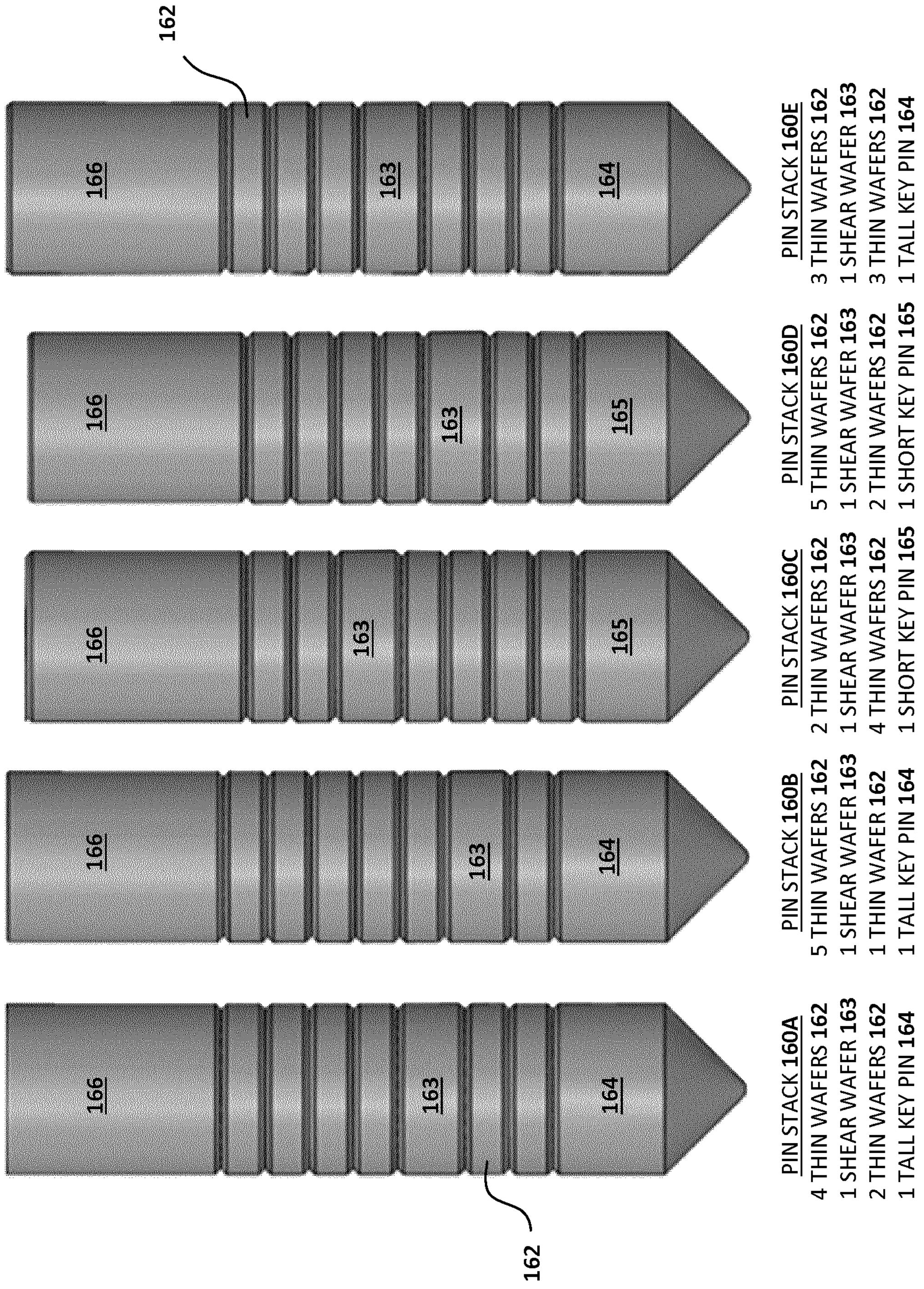
FIG. 10 is a side elevation view of the five pin stacks indicating the unique stacking arrangements of thin wafers, a shear wafer and key pins in each of the pin stacks which are matched to the key to provide the true shear line for actuating the lock assembly, in accordance with an aspect of the present disclosure.
Figure 11B:
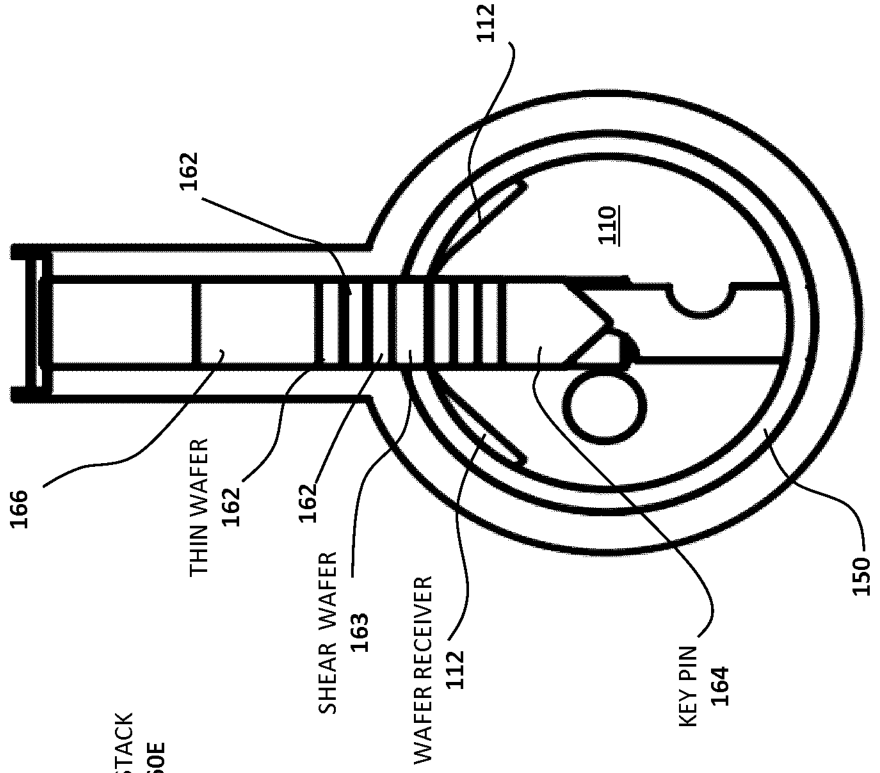
FIG. 11B is an end elevation view of the cross-section of FIG. 11A, in accordance with an aspect of the present disclosure.
Figure 11A:
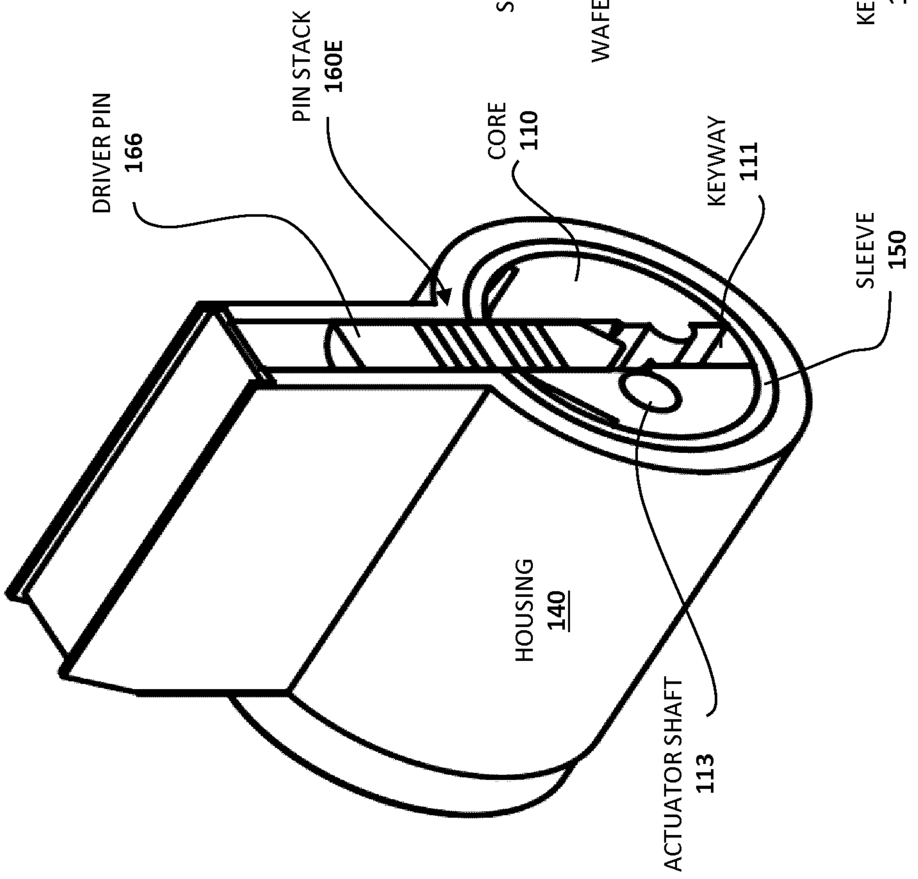
FIG. 11A is a perspective view of a cross-section of the lock assembly taken through pin stack, in accordance with an aspect of the present disclosure.

Turning now to FIG. 10, there is shown a side elevation view of five pin stacks 160A-E (excluding the rightmost sixth pin stack with the centralizer pin 168, which is included in FIG. 9). The five pin stacks 160A-E are arranged in this view with the vertices of the key pins 164 and 165 aligned in order to more clearly discern the different arrangement of thin wafers 162 with respect to the shear wafer 163 within each pin stack. It is to be understood that each pin stack includes one driver pin 166, six thin wafers 162, one shear wafer 163 and either a tall key pin 164 or a short key pin 165. In this particular embodiment, the difference in height between the tall key pins 164 and short key pins 165 is equivalent to half of the height of one thin wafer 162. In this particular embodiment, all driver pins 166 have a substantially identical height; all thin wafers 162 have a substantially identical height; and all shear wafers 163 have a substantially identical height. In this particular embodiment, the proportions of relevant heights of selected components of each pin stack 160 is as follows: proportional height difference between tall key pins 164 and short key pins 165=1; height of thin wafers 163=2; and height of shear wafers 163=3. Alternative embodiments may be provided with pin stacks having wafers and/or key pins and driver pins of different dimensional proportions with more or fewer wafers.

It can be seen that each one of the pin stacks 160A-E has a different vertical arrangement of thin wafers 162, shear wafers 163 and key pins 164 and 165 (for example, pin stack 160A has a top-to-bottom arrangement of four thin wafers 162, one shear wafer 163, two thin wafers 162 and one tall key pin 164 and the adjacent pin stack 160B has a top-to-bottom arrangement of five thin wafers 162, one shear wafer 163, one thin wafer 162 and one tall key pin 164—therefore the vertex of the tall key pin 164 of pin stack 160B must be moved to a higher level than its corresponding tall key pin 164 of pin stack 160A to align the shear wafers 163 of these two pin stacks 160A and 160B, as seen in FIG. 9). These arrangements provide the ability to change the vertical level of the shear wafer 163 within each of the pin stacks 160A-E. Therefore, only when the correct key 120 is inserted into the keyway 111, will the pin stacks 160A-E be properly elevated to align the bottom edge of each shear wafer 163 with the outer surface of the core 110 such that the shear wafer 163 will move into one of the wafer receivers 112 as the core 100 is rotated (see FIG. 9). It is to be understood that many different combinations of different arrangements of pin stacks is possible and these different combinations will require corresponding different true key configurations to properly actuate the lock mechanism.

Figure 12:
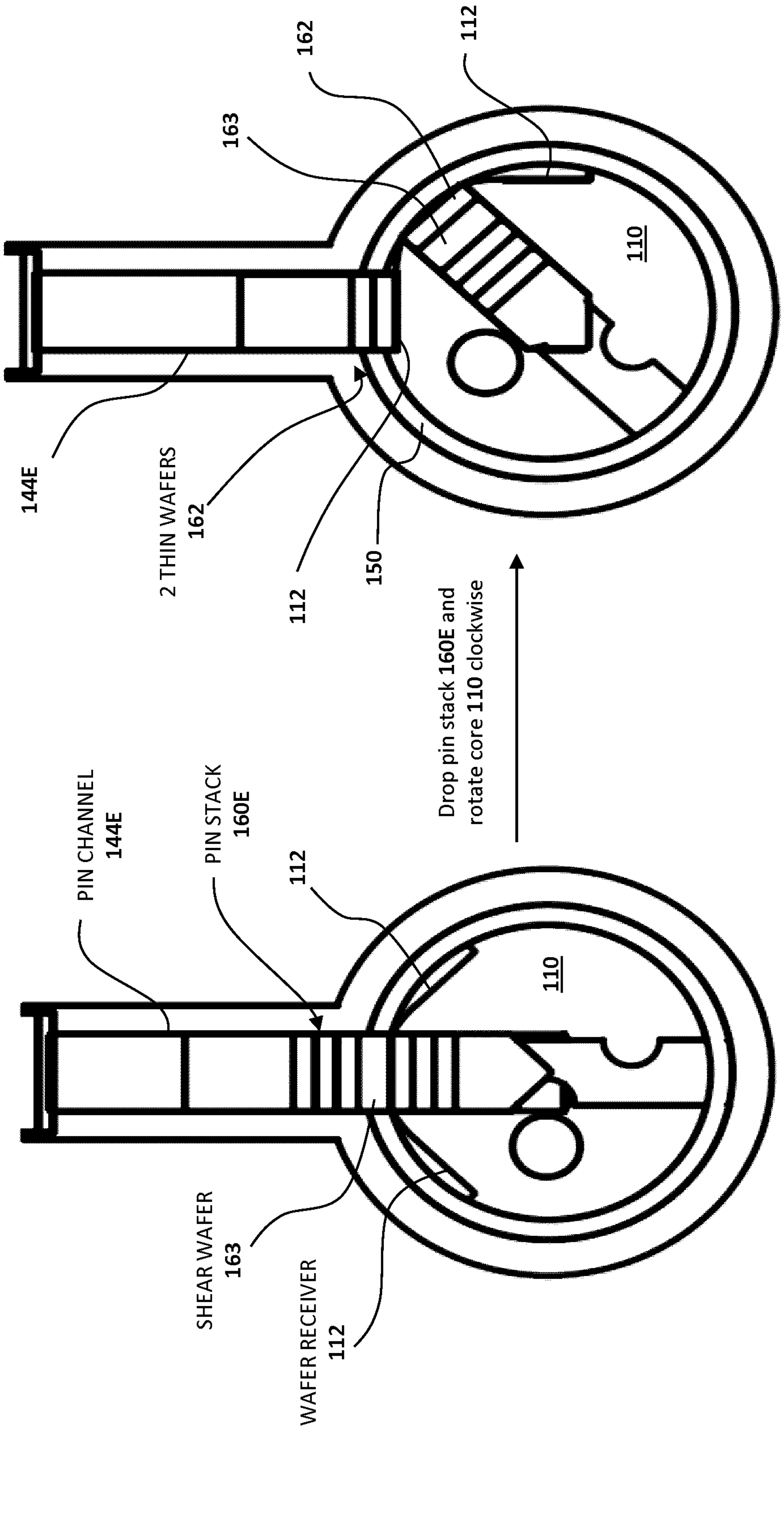
FIG. 12 is a scheme of end elevation views of embodiment indicating the result of rotation of the core clockwise (with respect to the orientation shown) via a first decoy shear line provided when the shear wafer is located below the true shear line. The top two thin wafers block further rotation of the core, in accordance with an aspect of the present disclosure.
Figure 13:
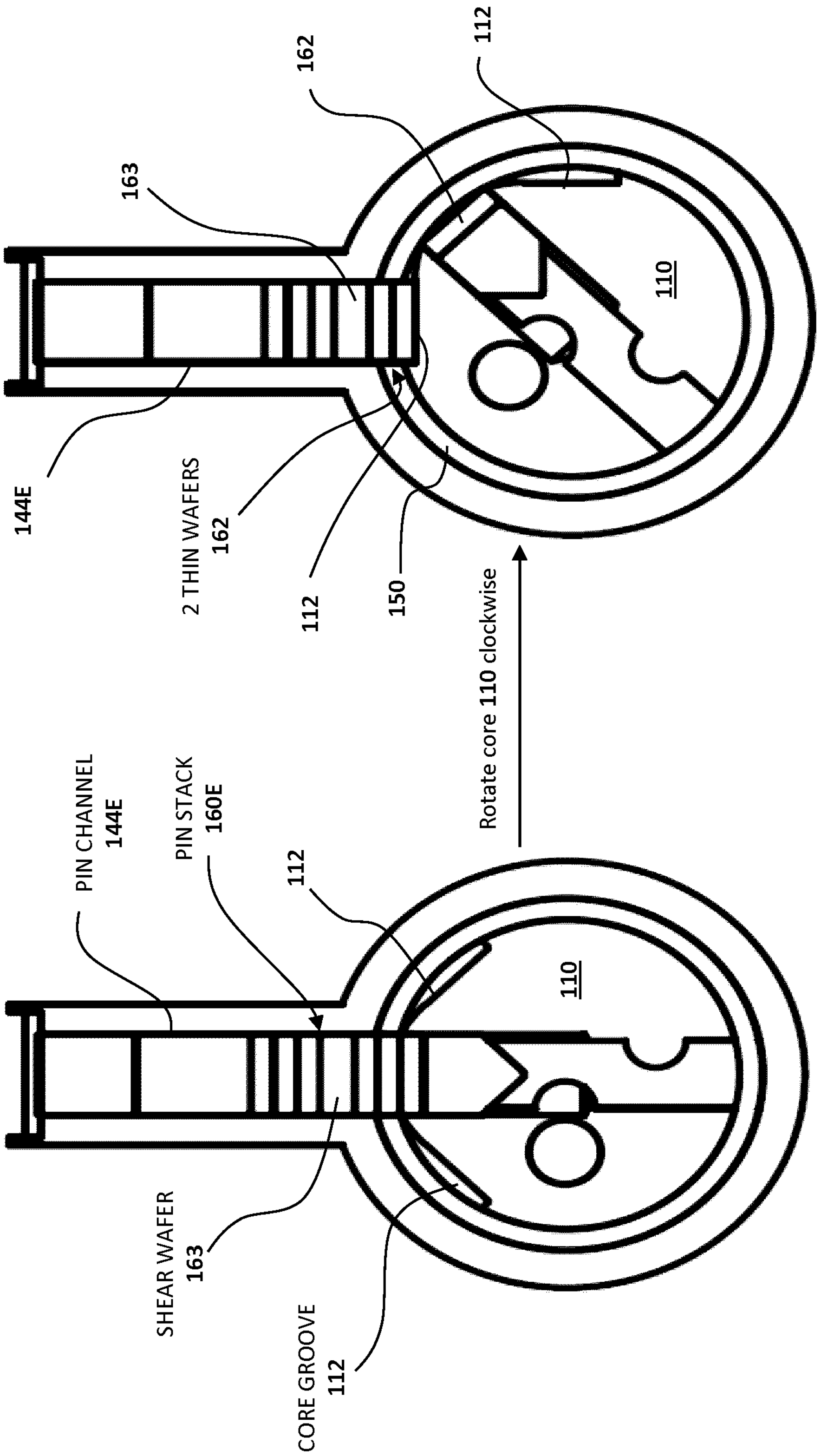
FIG. 13 is a scheme of end elevation views of embodiment indicating the result of rotation of the core clockwise (with respect to the orientation shown) via a different decoy shear line provided when the shear wafer is located above the true shear line. Two thin wafers located below the shear wafer block further rotation of the core, in accordance with an aspect of the present disclosure.
Figure 14:
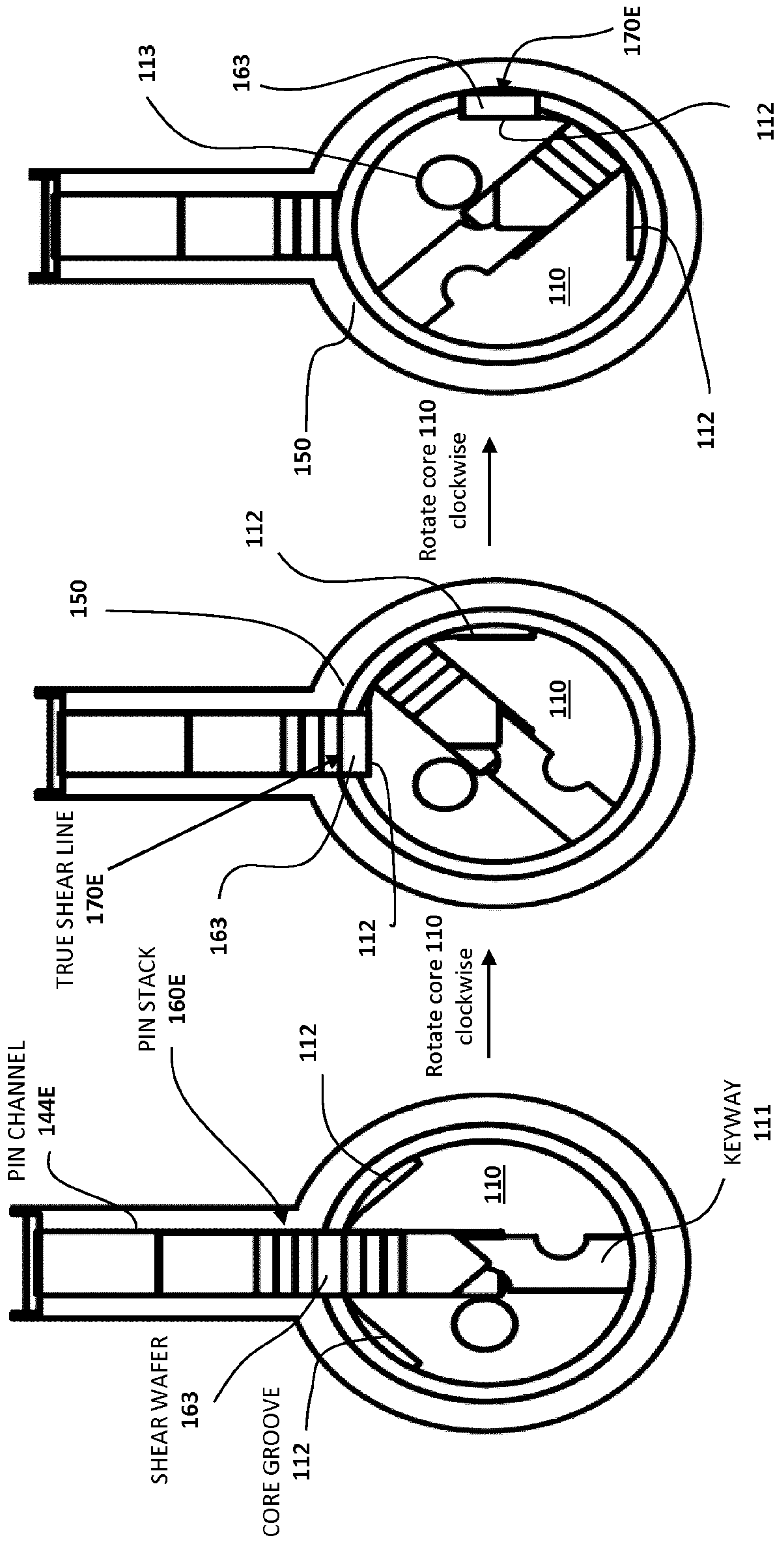
FIG. 14 is a scheme of end elevation views of embodiment indicating the result of rotation of the core clockwise (with respect to the orientation shown) when the shear wafer is located at the true shear line. The shear wafer occupies the entire volume of the wafer receiver with additional height equivalent to the thickness of the core to align with the true shear line, in accordance with an aspect of the present disclosure.
Figure 15:
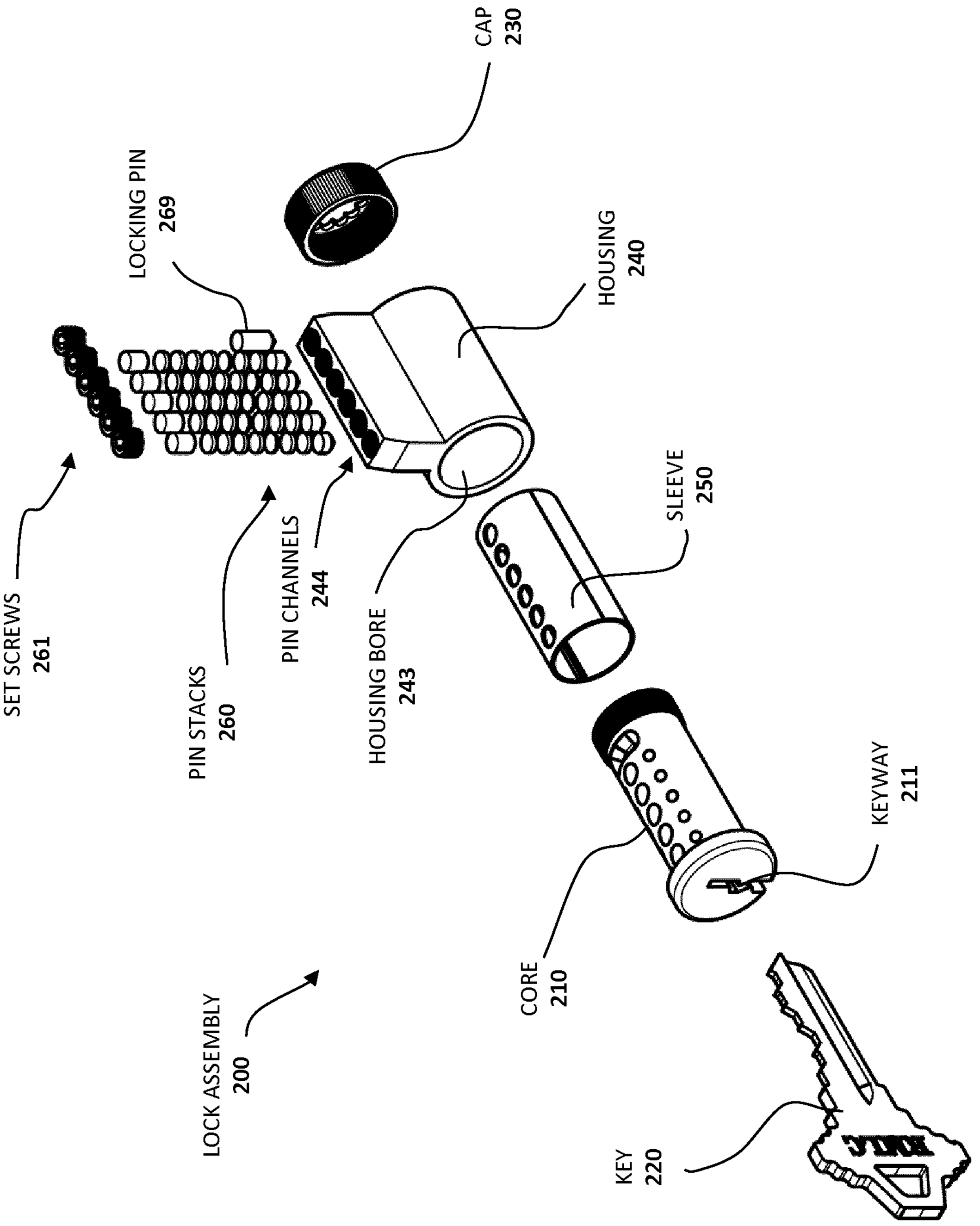
FIG. 15 is an exploded view of a second embodiment of a lock assembly, in accordance with an aspect of the present disclosure.
Figure 16B:
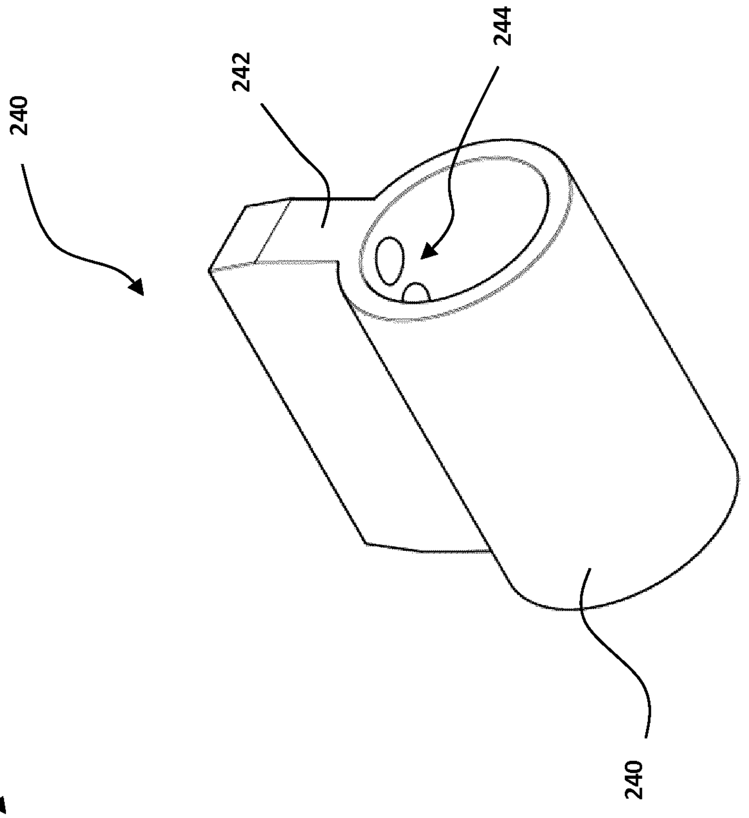
FIG. 16B is another perspective view of the housing of the lock assembly, in accordance with an aspect of the present disclosure.
Figure 16A:
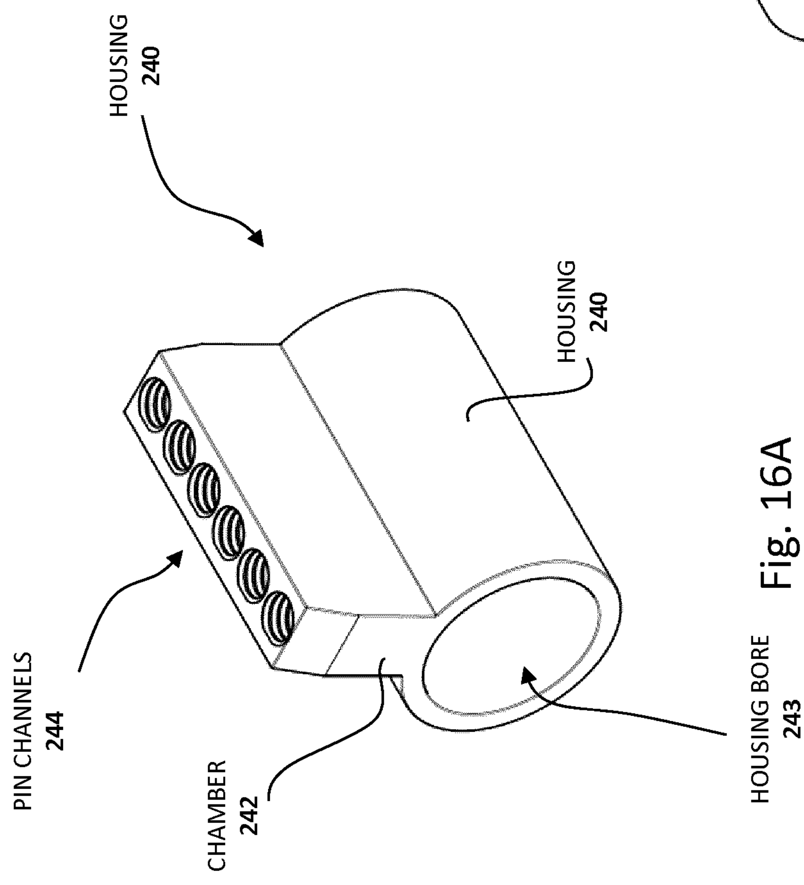
FIG. 16A is a perspective view of the housing of the lock assembly, in accordance with an aspect of the present disclosure.

FIGS. 11 to 14 illustrate transverse cross sections of the lock assembly taken across pin stack 160E. FIGS. 11A and 11B are provided for the purpose of labelling the main components involved in the functionality of the device in providing several decoy shear lines for pin stack 160E so that they can be recognized with minimal labelling in FIGS. 12 to 14 in an effort to preserve clarity. FIGS. 12 to 14 illustrate rotation of the core 110 and components of the pin stack 160 in generation of decoy shear lines (FIGS. 12 and 13) and the true shear line (FIG. 14).

Turning now to FIG. 12, the cross-section image on the left side of the arrow has the core 110 in the resting centralized position. The cross-section image on the right indicates the location of the core 110 and components of the pin stack 160E after the pin stack 160E is dropped and the core 110 is rotated clockwise in the orientation shown, while the sleeve 150 remains stationary. It is seen in the image on the right that the shear wafer 163 has dropped below the sleeve 150 into the keyway 111 and a decoy shear line is attained between the second and third uppermost thin wafers 162. This causes the wafer receiver 112 on the left side of the core 110 to become occupied by the uppermost two thin wafers 162. The combined height of the two thin wafers 162 is greater than the combined height of the leftmost side of the wafer receiver 112 and the thickness of the sleeve 150. A potential shear line between the first and second uppermost thin wafers 162 is located between the outer and inner sidewalls of the sleeve 150. This provides the effect of blocking further clockwise rotation of the core 110 and sleeve 150, which is required in order to actuate the lock mechanism which requires that the core 110 and sleeve 150 rotate together to press the actuator shaft 113 against the sidewall of the sleeve recess 154 (see FIG. 8) in order to rotate the connected end cap 130 which is connected to an actuator of a bolt or latch mechanism (not shown).

Referring now to FIG. 13, there is shown another example of a decoy shear line being attained with subsequent blockage of rotation of the sleeve 150 and core 110. In FIG. 13, the cross-section image on the left side of the arrow has the core 110 in the centralized position. The cross-section image on the right side of the arrow indicates the location of the core 110 and components of the pin stack 160E after the core is rotated clockwise in the orientation shown. It is seen in the image on the right that the shear wafer 163 has not dropped into the keyway 111 and instead remains in the pin channel 144E while two thin wafers 162 occupy the wafer receiver 112 to block rotation of the core 110 and sleeve 150. This provides the effect of blocking further clockwise rotation of the core 110 and sleeve 150 as described above for FIG. 12.

With two examples of decoy shear lines in pin stack 160E having been described with respect to FIGS. 12 and 13 (and understanding that more decoy shear lines are possible), the operation of the lock assembly 100 when the true shear line is attained is now described with respect to FIG. 14. While not illustrated specifically in FIG. 14, it is to be understood that operation of the lock mechanism requires that all five of the pin stacks 160A-E are arranged to have their corresponding shear wafer 163 in the same position as shown in FIG. 9, with the bottom surface of each shear wafer located above the upper surface of the core 110 (in other words, if one of the pin stacks 160 is not aligned properly with the true shear line, the sleeve 150 will not rotate). The completely aligned true shear line position is illustrated in the leftmost cross-section image in FIG. 14. In this leftmost image, the shear wafer 163 is initially aligned with the keyway 111 and the pin channel 144E and located between the two wafer receivers 112. With initial clockwise rotation of the core 110 in the middle image, it is seen that the shear wafer 163 has dropped into the left wafer receiver 112. It is to be noted in this middle image that the top surface of the shear wafer 163 is aligned with the outer surface of the sleeve 150 and therefore, there is no blockage of rotation of the sleeve 150 as occurs for the decoy shear lines illustrated in FIGS. 12 and 13. Because there is no blockage, true shear line 170E is attained and both the core 110 and the sleeve 150 are permitted to rotate further clockwise to the position shown in the rightmost image, where it is seen that the shear wafer 163 held in the left wafer receiver 112 has rotated over to the right side. In attaining this position, the actuator shaft 113 then can press against the sidewall of the recess 154 of the sleeve 150 (see FIG. 8) to cause the sleeve 150 and connected cap 130 to rotate and actuate the locking mechanism.

The operating principle of this embodiment 100 of the lock mechanism requires blockage of rotation of the sleeve 150 when a decoy shear line is attained and allowance of rotation of the sleeve 150 when the true shear line is attained, and in the latter case only when the true shear line is attained for all five of the pin stacks 160A-E. In this embodiment 100, the true shear line 170E is attained by having the height dimension of the shear wafer 163 substantially equivalent to the depth of the wafer receiver 112 plus a transverse cross-sectional width of the sleeve 150, thereby providing the true shear line between an upper surface of the shear wafer 163 and a sidewall of the main bore 143 of the housing 140.

Because there are seven decoy shear lines and one true shear line for each of the five pin stacks 160A-E, the total number of possible shear lines in this embodiment 100 is $8^5$=32,768 and therefore the odds of successfully picking this lock assembly is 1 in 32,768. These highly challenging odds are expected to immediately deter even the most skilled of lock pickers. This embodiment has one true shear line for each pin stack. Alternative embodiments may have additional true shear lines for each pin stack to provide a master keying system. However, it is recognized that provision of additional true shear lines decreases the number of decoy shear lines.

In FIGS. 15 to 25, there is shown a second example embodiment of a pick-resistant lock assembly 200 developed by the present inventor. In the exploded view shown in FIG. 15, it is seen that the lock assembly 200 has several general features which are similar to those of embodiment 100, such as a key 220, a core 210 with a keyway 211, a sleeve 250 a housing 240 with a housing bore 243 and pin channels 244 in a chamber 242 for holding pin stacks 260 and a locking pin 269. The core 210 extends through the housing 210 and is configured to receive an end cap 230. One difference between this embodiment 200 and the previously described lock assembly 100 is that the pin channels 244 are covered by individual set screws 261 threaded upper ends of the pin channels 244 formed in the pin chamber 242 of the housing 240 (see FIG. 16A). The set-screws facilitate re-keying of the lock to a new true key by permitting a locksmith to reconfigure the pin stacks 260 individually while keeping the other pin stacks contained within the pin channels 244. The pin stacks 260 also have springs (not shown in FIG. 15) located between the set screws 261 and the driver pins 266 (illustrated best in FIG. 19) in an arrangement similar to the arrangement of springs 161 illustrated for lock assembly 100 (see FIG. 9). The springs of embodiment 200 also provide a downward-biased force on the driver pins 266 which is overcome by placing the true key 220 (or other implement) into the keyway 211.

Figure 17B:
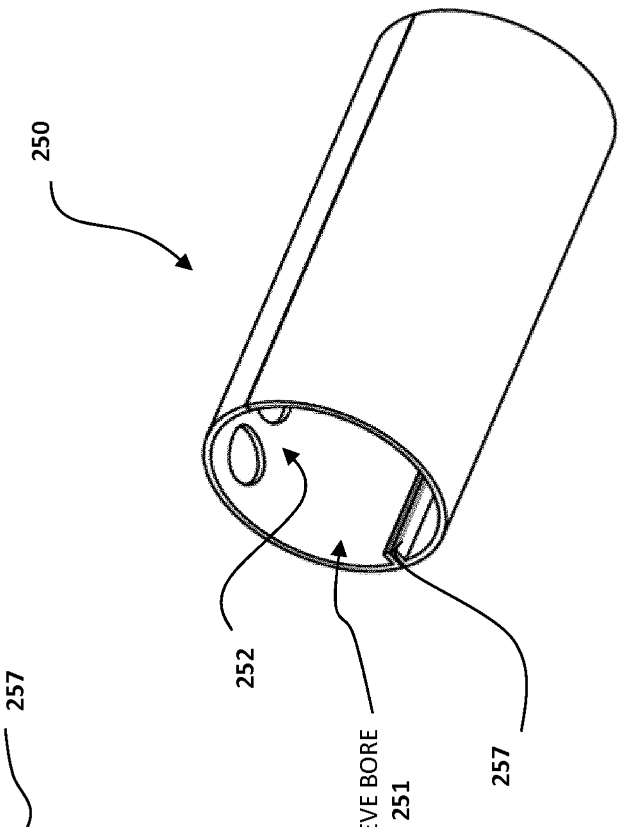
FIG. 17B is another perspective view of the sleeve of the lock assembly, in accordance with an aspect of the present disclosure.
Figure 17A:
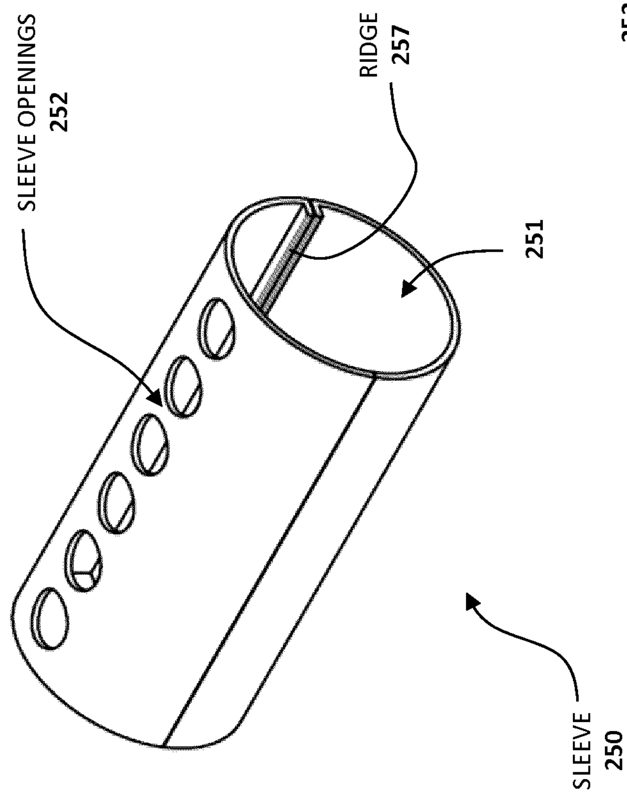
FIG. 17A is a perspective view of the sleeve of the lock assembly, in accordance with an aspect of the present disclosure.

The sleeve 250 is shown by itself in two different orientations in FIGS. 17A and 17B, indicating an arrangement of six sleeve openings 252 extending into the central bore 251 of the sleeve 250. This sleeve 250 differs from the sleeve 150 of embodiment 100 by having an internal ridge 257 which plays a role in rotation of the sleeve 250 as described hereinbelow. The sleeve 250 in of this embodiment 200 is conveniently formed of two parts in order to conveniently form the ridge 257 which functions to move the sleeve 250 with the core 210 when the true shear lines are attained.

Figures 18A, 18B, 18C:
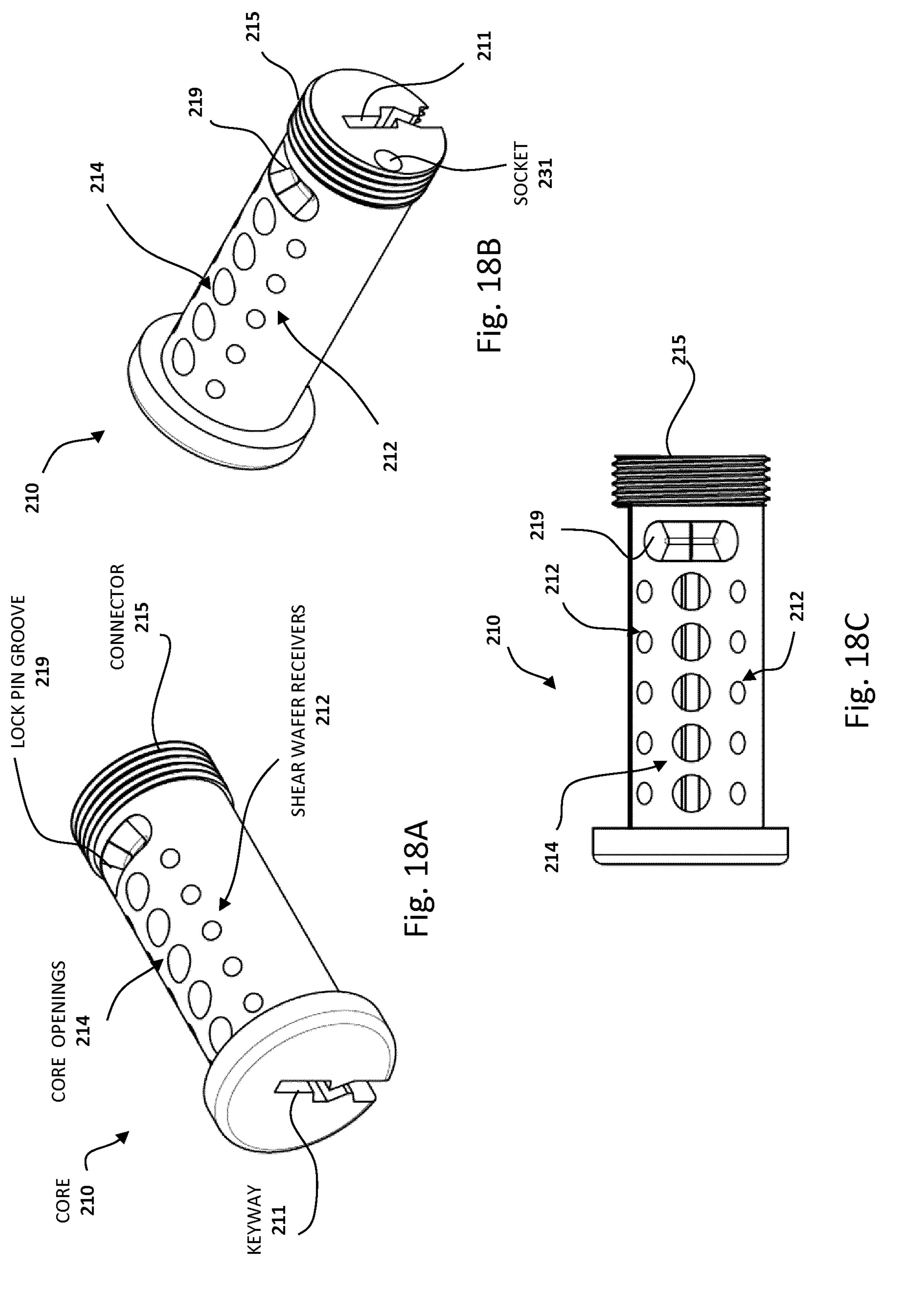
FIG. 18A is a perspective view of the core of the lock assembly, in accordance with an aspect of the present disclosure.
FIG. 18B is another perspective view of the core of the lock assembly, in accordance with an aspect of the present disclosure.
FIG. 18C is a top view of the core of the lock assembly, in accordance with an aspect of the present disclosure.
Figure 19:
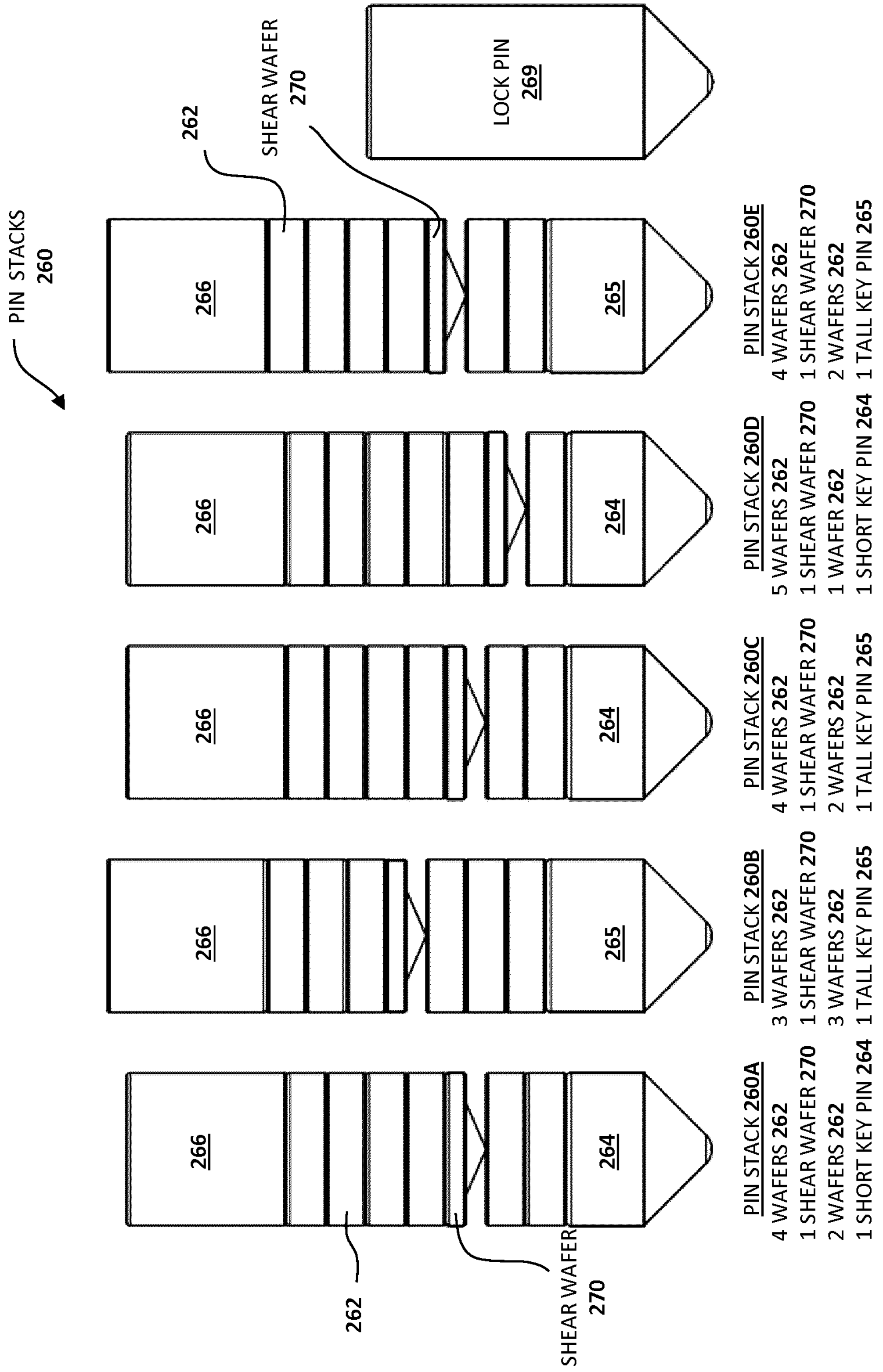
FIG. 19 is a side elevation view of the five pin stacks indicating stacking arrangements of thin wafers, a shear wafer and key pins in each of the pin stacks which are matched to the true key to provide the true shear line for actuating the lock assembly. The lock pin is also shown, in accordance with an aspect of the present disclosure.
Figure 20B:
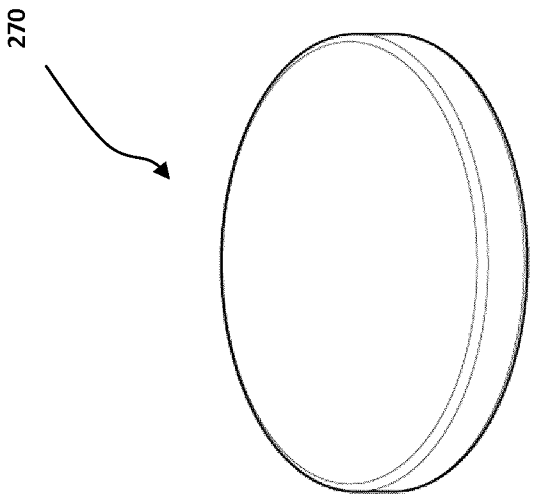
FIG. 20B is a top perspective view of the shear wafer, in accordance with an aspect of the present disclosure.
Figure 20A:
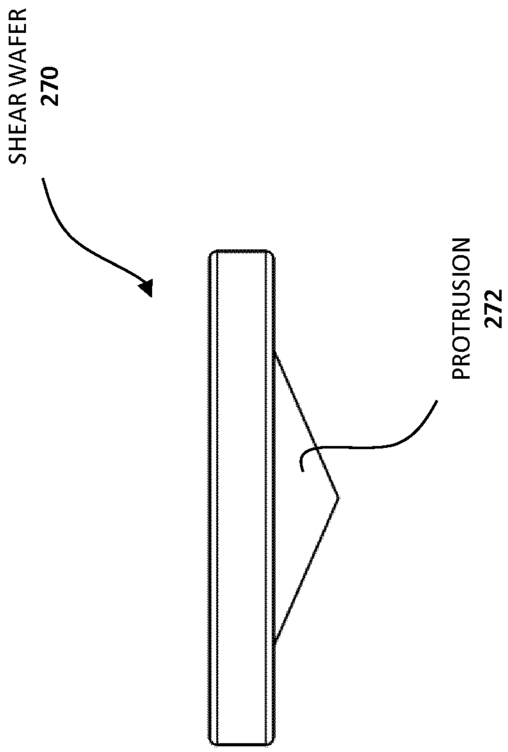
FIG. 20A is a side elevation view of the shear wafer of embodiment, in accordance with an aspect of the present disclosure.

The core 210 is shown in three different orientations in FIGS. 18A, 18B and 18C. Like the core 110 of embodiment 100, a series of core openings 214 is provided to hold the pin stacks 260. The wafer receivers 212 however differ from the wafer receivers 112 of embodiment 100. The wafer receivers 112 of embodiment 100 are in the form of laterally extending grooves on each side of the core openings. In contrast, in embodiment 200, the wafer receivers 212 formed in the core are indentations or divots which are separated in space across the outer sidewall of the core 210 from the core openings 214 and which are shaped specifically to receive and retain a complementary shaped shear wafer 270, which is illustrated in FIGS. 19 and 20. In this particular embodiment, the wafer receiver 212 is shaped to receive a lower conical protrusion 272 (see FIG. 20A) of the otherwise disk-shaped shear wafer 270. However, alternative embodiments may use other shapes such as spikes, radiused protrusions, blocks or other three-dimensional polygonal shapes, provided that the indentations and the shaped shear wafers have complementary shapes permitting the shear wafers to partially fit within the indentations such that the upper surface of the shear wafer aligns with the shear line to permit rotation of the sleeve 250, as described in more detail hereinbelow, to permit rotation and actuation of the lock assembly 200.

The core 210 of embodiment 200 also differs from the core 110 of embodiment 100 by being provided with a lock pin groove 219 and a threaded connector 215 for connecting the core 210 to the cap 230. The functionality of the lock pin groove 219 will also be described in more detail hereinbelow. FIG. 18C also shows a socket 231 which cooperates with a complementary protrusion in the inner sidewall of the cap 230 in the actuation mechanism (not shown).

In this embodiment 200 sleeve is not connected to the actuator. The actuator is activated by the core 210 turning past 45 degrees.

The socket 231 arrangement in this embodiment 200 is a conventional feature. It serves to lock the end cap 230 in place by having a spring pushing a pin into one of the semi-circular features in the end cap 230 so it cannot rotate and come off inside the lock housing 240. The pin that resides in this socket 231 also serves to connect the core 210 to the actuator that is sandwiched between the core 210 and the end cap 230.

Other arrangements of engaging structures may be provided in alternative lock actuation mechanisms.

FIG. 19 illustrates a representative example of an arrangement of pin stacks 260 for embodiment 200 in a manner similar to that of FIG. 10, described above. Each pin stack includes a driver pin 266, six thin wafers 262, a single shear wafer 270 and either a short key pin 264 or a tall key pin 265. As indicted in the list of components below each one of the pin stacks 260A-E, the shear wafer 270 of each pin stack can be provided at a different height matching its position on the true key to generate the true shear line for actuating the lock, as described above for embodiment 100.

Figure 21:
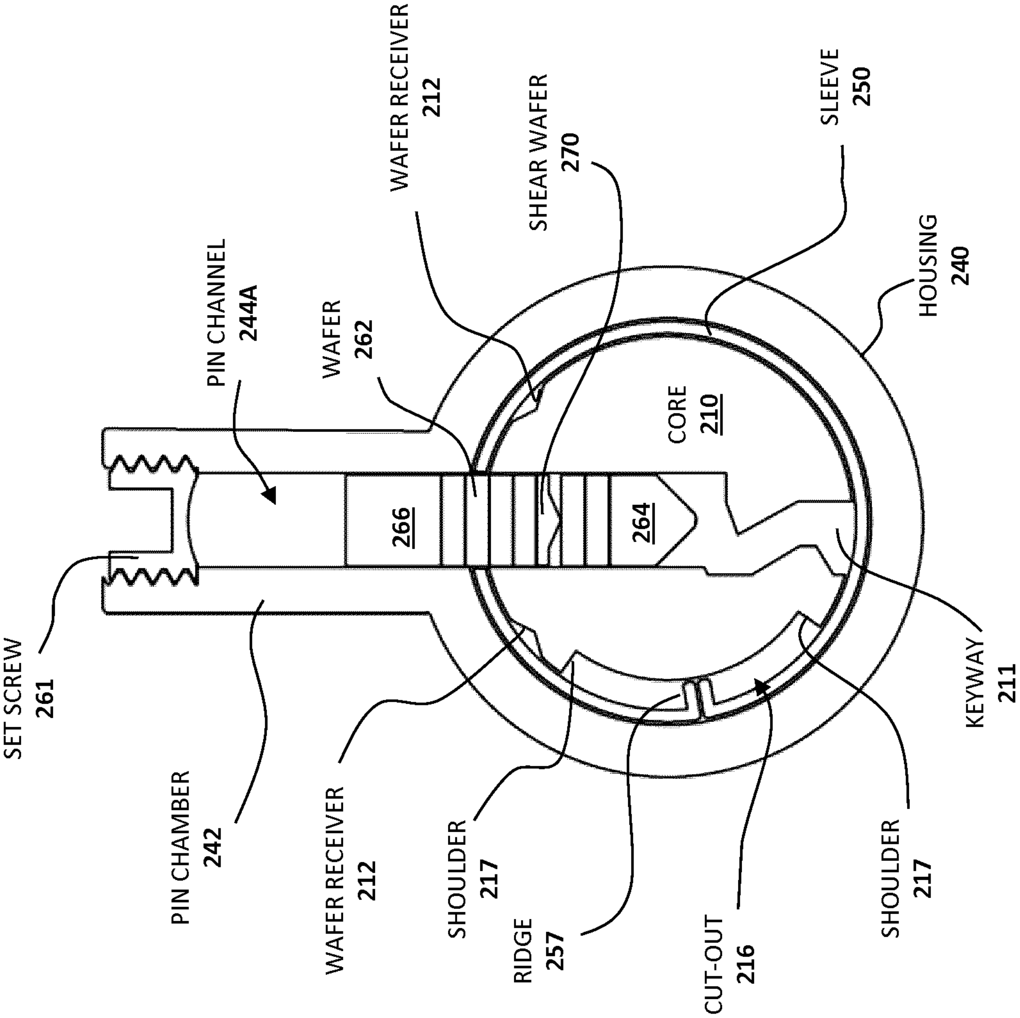
FIG. 21 is a lateral cross-sectional view taken across pin stack, in accordance with an aspect of the present disclosure.

Turning now to FIG. 21, there is shown a cross section of the lock assembly 200 taken across pin stack 260A, which has a vertical arrangement from top to bottom which includes a driver pin 266, four thin wafers 262, a shear wafer 270, two thin wafers 262 and a short key pin 264. It can be seen that the core 210 is shaped differently from the core 110 of embodiment 100. In addition to the differently shaped wafer receivers 212, core 210 includes a longitudinal cut-out portion 216 defining a recess with a shoulder 217 at each end. The ridge 257 of the sleeve 250 is located within this cut-out 216 and is moveable therewithin when the sleeve 250 is rotated. This cross-sectional view also indicates that the wafer receivers 212 are conical-shaped divots. It can be seen in this view that the labeled thin wafer 262 has a height which blocks rotation of the sleeve 250 if the core 210 is rotated.

Figure 22:
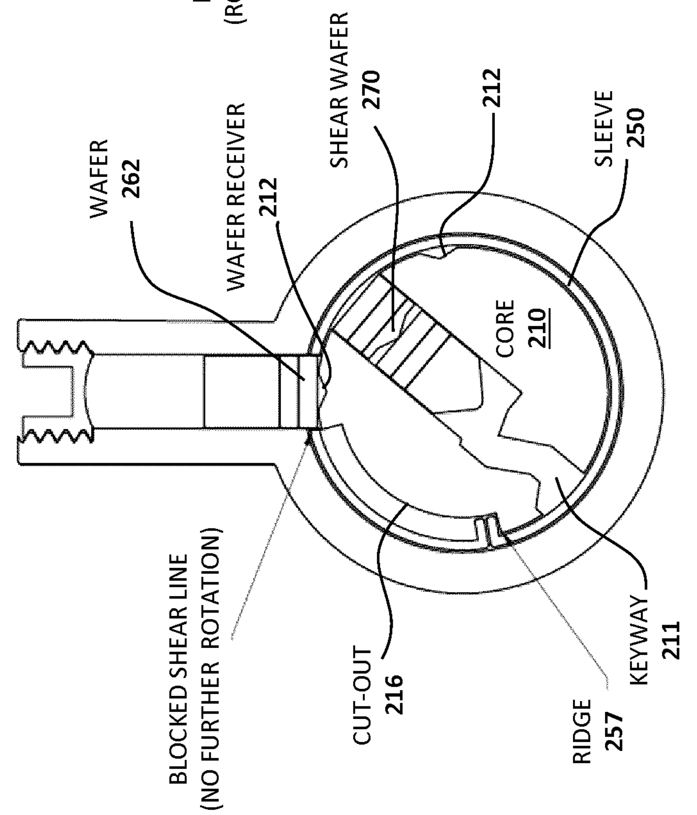
FIG. 22 is the same cross-sectional view shown in FIG. 21 with the core rotated approximately 45 degrees clockwise (with respect to the orientation shown), indicating blockage of the shear line of pin stack by a thin wafer while the shear wafer is located in the pin stack deeper within the core. The sleeve cannot rotate further clockwise in this arrangement, in accordance with an aspect of the present disclosure.

FIG. 22 shows the result of such a clockwise rotation of the core where the labelled wafer 262 blocks rotation of the sleeve 250. In this arrangement, the shear wafer 270 is located further down inside the core 210 and incorrectly placed for lock actuation. The rotation of the core 210 indicated in FIG. 22 therefore represents a decoy shear line.

Figure 23:
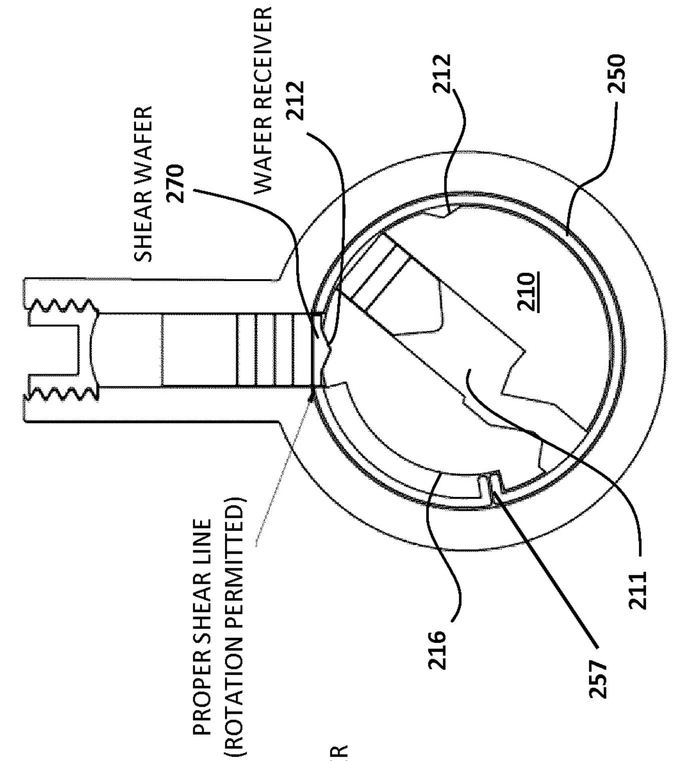
FIG. 23 is the same cross-sectional view shown in FIGS. 21 and 22 with the core rotated approximately 45 degrees clockwise (with respect to the orientation shown), indicating provision of the proper shear line with the shear wafer contained in the wafer receiver. In this arrangement, the sleeve may rotate further clockwise, in accordance with an aspect of the present disclosure.
Figure 24:
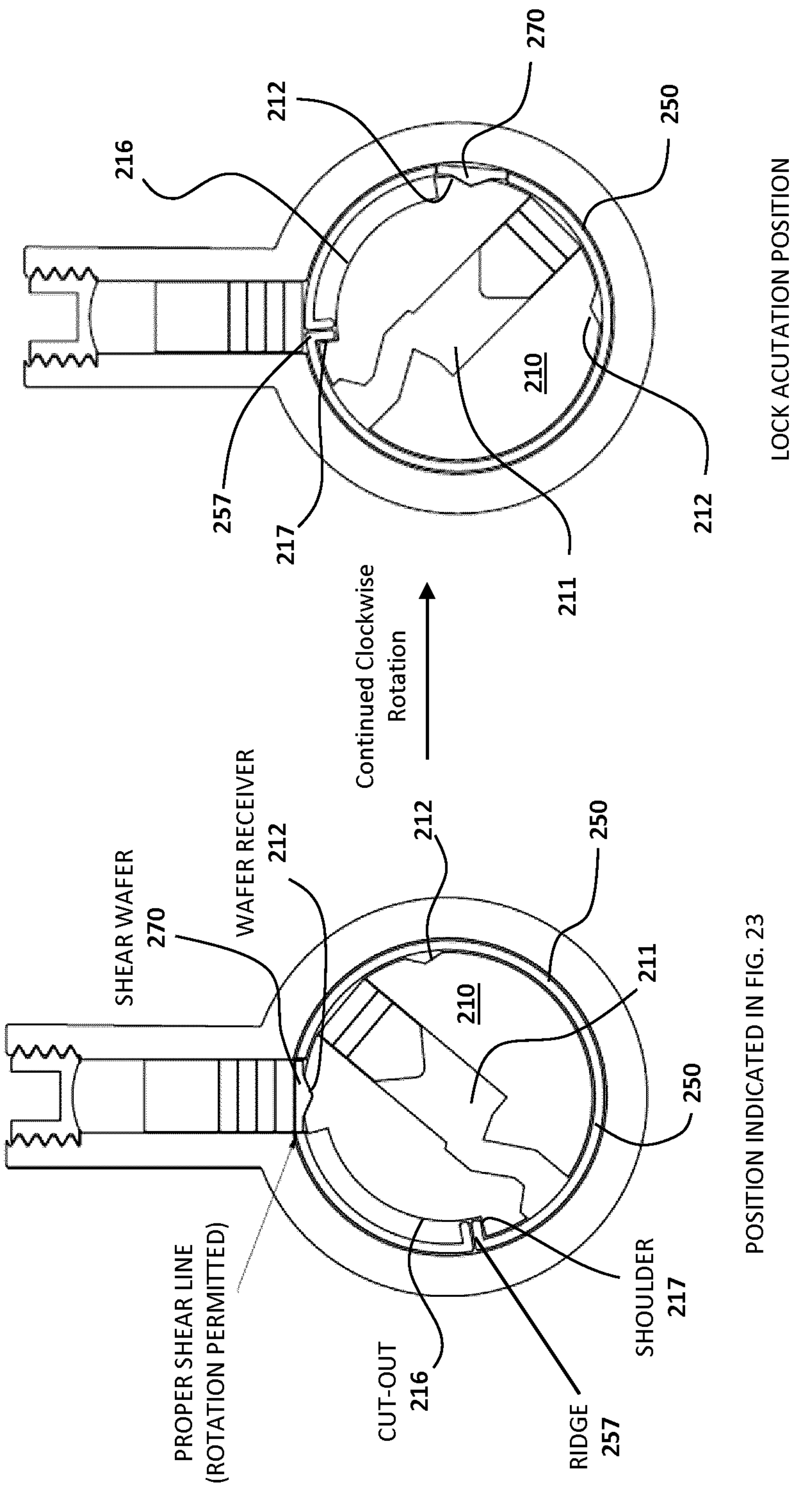
FIG. 24 indicates further rotation of the sleeve and the core together from the orientation shown in FIG. 23, approximately 315 degrees clockwise (with respect to the orientation shown) to bring the core and the sleeve to the lock actuation position, in accordance with an aspect of the present disclosure.

FIG. 23, in contrast with FIG. 22, shows the proper pin height for pin stack 260A which would be provided by the true key pushing the pin stack 260A to the correct height. It is seen that the shear wafer 270 is at the correct height to have dropped into the wafer receiver 212. The result of this action is that the top surface of the shear wafer 270 is at the same height as the outer sidewall of the sleeve 250, thereby providing the true shear line for this pin stack 260A and permitting further rotation to occur. The results of this rotation are shown in FIG. 24, where the arrangement of FIG. 23 is copied on the left side to facilitate visualization of the movement of components in the process. The lower shoulder 217 of the cut-out 216 of the core 210 is pushed upward against the ridge 257 of the sleeve 250, causing the sleeve 250 to rotate clockwise as well. Continued rotation to provide the arrangement on illustrated on the right side of FIG. 24 indicates that the shear wafer 270 continues to occupy the wafer receiver 212 as the core 210 and sleeve 250 are rotated together. The rotation to this position will lead to actuation of the lock in a manner similar to the actuation described above for embodiment 100, with a cooperative interaction between complementary engaging structures provided between the inward end surface of the core 210 and an inner surface of the cap 230 serving to actuate the lock. The socket 231 seen in FIG. 18B is an example of such an engaging structure which cooperates with a complementary structure (not illustrated) provided in the cap 230.

Figure 25:
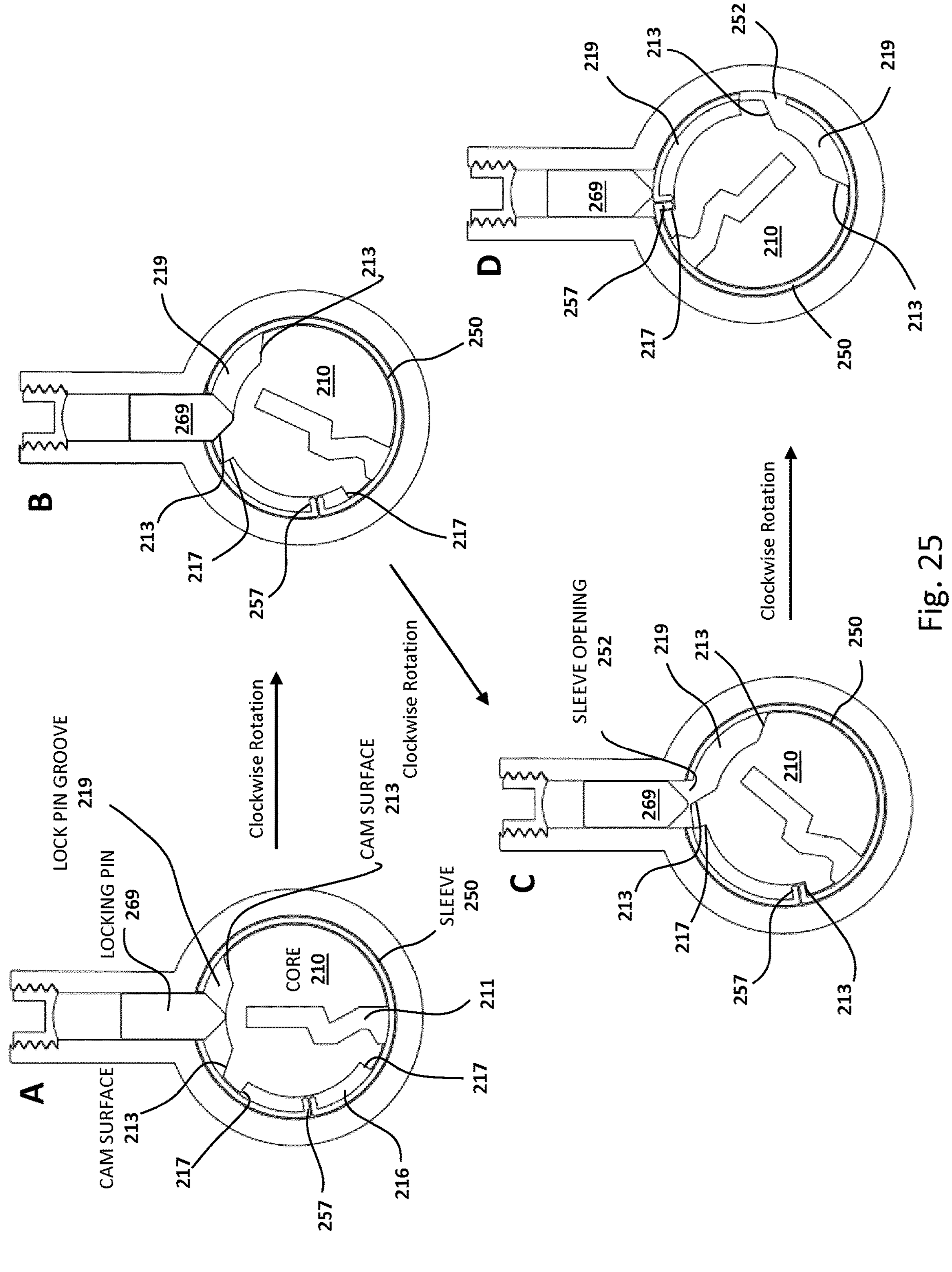
FIG. 25 illustrates a series of the core and the sleeve positions in lateral cross sectional views taken across the locking pin groove indicating different positions of the locking pin attained during clockwise rotation (with respect to the orientation shown) of the core and sleeve, in accordance with an aspect of the present disclosure.

Turning now to FIG. 25, there is shown operation of the lock pin 269 and the lock pin groove 219 formed in the core 210 which is another feature of embodiment 200 that differs from embodiment 100. The lock pin groove 219 is also shown in FIGS. 18A to 18C where it is seen that it is located adjacent to the connector 215. The lock pin groove 219 has curved inner sidewalls which provide a cam surface 213 (see FIG. 25) that allows the lower end of the lock pin 269 to ride up and out of the lock pin groove 219 only when the true key has activated all of the true shear lines of the pin stacks 260. With reference to FIG. 25, there is shown a series of core 210 and sleeve 250 positions as cross sections taken through the lock assembly at the section cutting through the locking pin 269. In step A, the locking pin 269 is located in the middle of the lock pin groove 219 with the lock assembly 200 in the resting position (keyway 211 oriented vertically). Following clockwise rotation of the core 210 to the position shown in step B, the lock pin groove 219 moves to the right and the bottom of the lock pin 269 encounters the cam surface 213 of the lock pin groove 219. As noted with respect to FIG. 24, further rotation of the sleeve 250 is only permitted if the true shear line of each pin stack 260 is attained. In this case, further rotation to step C (lower left of FIG. 25) causes the lower end of the lock pin 269 to slide out to the surface of the core 210. From that point, the lower end of the lock pin 269 can move up to the outer surface of the sleeve 250, allowing rotation to the lock actuation position of step D.

It is to be understood that the lock pin 269 moves to the outer surface of the core 210 just after the pin channels 244 are no longer accessible via the keyway 211 and just before the series of shear wafers 270 drop into their respective wafer receivers 212. Therefore, the lock pin 269 locks the sleeve 250 to the housing 240 until the core 210 is rotated to "test" the shear line. As a result, the lock pin groove 219 moves every time the core is rotated and not just when the true shearline is reached. The main purpose is to stop lock picking efforts which attempt to set pins above the sleeve to operate the lock. In some embodiments, the lock pin groove 219 may also have a slightly deeper indentation at top dead center, to help realign the core 210 while removing the key after lock operation. The sleeve 250 only serves to stop the rotation of the core after turning it about 40 degrees in either direction when a decoy shear line is selected.

The following is a summary of the order of operation of lock assembly 200 with the assembly 200 installed as a standard door lock and referring to the orientation of the cross sections of FIGS. 23 to 25, with the starting position of the keyway 211 defined as zero degrees. When the true key 220 (not shown in FIGS. 23 to 25) is inserted and used to rotate the core 210 clockwise by about 35 degrees, the lock pin 269 moves out of the lock pin groove 219. A further clockwise rotation to about 40 degrees causes the lower shoulder 217 of the core 210 to make contact with the ridge 257 of the sleeve 250. This action causes sufficient rotation of the core to cause the shear wafer 270 to drop into the left wafer receiver 212. This action provides the true shear line and permits the sleeve 250 to rotate together with the core 210. Further rotation by about 45 degrees initiates actuation of the lock. Further rotation by about 40 degrees retains the lock in the open position and the shear wafer 270 is returned to the pin stack 244. Subsequent counter-clockwise rotation by about 35 degrees places the lock pin 269 back into the lock pin groove 219. Continued rotation back to zero degrees (the resting position) permits removal of the key 220 from the keyway 211. To re-lock the assembly 200, the same operations are repeated in the reverse direction.

During a lock picking attempt using any implement other than the true key 220, the core 210 may be rotated by up to about 35 degrees causing the lock pin 269 to move upward. Further rotation of the core 210 is possible to about 40 degrees where the core 210 engages the sleeve 250 at the ridge 257. However, no further rotation is possible at this stage because a wafer 262 other than the shear wafer 270 blocks the rotation of the sleeve 250 and the core 210. Further pushing of the shoulder 217 of the core 210 against the ridge 257 of the sleeve 250 is not possible.

The functionality of lock assembly embodiment 200 provides the possibility of configurations having multiple true shear lines. This is useful for alternative embodiments configured as "master keyed systems" with locks configured to be operated by more than one true key. This arrangement is provided by placing two or more shear wafers in one or more pin chambers. While this does decrease the amount of decoy shearlines, it does so by an insignificant margin and the benefits to the end user outweigh the risks. Since all master key systems are slightly less secure than non-master key systems, locksmiths would be expected to generally inform customers of the risks and benefits of master-keyed systems.

It is to be understood that the foregoing description has focused on two main example embodiments. A number of variations are possible which are within the scope of the appended claims. For example, alternative embodiments may include more or fewer pin stacks held in more or fewer pin channels. Alternative embodiments may include more or fewer wafers than described for the example embodiment. While the wafers described in the example embodiments are disk-shaped, other shapes are possible, such as square, polygonal or alternative radiused shapes such as ellipses or ovals for example. If such alternative wafer shapes are incorporated, the shapes of the pin channels, sleeve openings and core openings would be altered accordingly to accommodate the alternative wafer shapes. Alternative embodiments may also include wafers having more than two different sizes, as long as the pin stacks are configured to provide at least one true shear line as a result of alignment of a shear wafer with the outer surface of the sleeve.

While the example embodiment includes core wafer receivers on either lateral side of the core openings, alternative embodiments may include only a single wafer receiver located on one side of the core openings. In such alternative embodiments, the alternative embodiment will be configured for rotational movement in only one direction.

While the example embodiment 100 includes an arrangement of wafers with a shear wafer having a height dimension greater than the height dimension of the remaining wafers, alternative embodiments may have the remaining wafers with a height dimension greater than the height dimension of the shear wafer. While the example embodiment 200 includes shear wafers with a conical protrusion 272, alternative shaped protrusions such as knobs, squares, or other three dimensional polygonal shapes may be used in alternative embodiments if the wafer receiver is provided with a complementary shape to preserve the function of generating a true shear line.

Any patent, publication, internet site, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art.

While the lock assembly is described with references to example embodiments thereof, it will be understood by those skilled in the art that various changes in form and details may be made therein without departing from the scope of the embodiments encompassed by the appended claims.

In the claims, articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context.

It is also noted that the term "comprising" is intended to be open and permits but does not require the inclusion of additional elements or steps. When the term "comprising" is used herein, the term "consisting of" is thus also encompassed and disclosed. Where ranges are given, endpoints are included. Furthermore, it is to be understood that unless otherwise indicated or otherwise evident from the context and understanding of one of ordinary skill in the art, values that are expressed as ranges can assume any specific value or subrange within the stated ranges in different embodiments, to the tenth of the unit of the lower limit of the range, unless the context clearly dictates otherwise. Where the term "about" is used, it is understood to reflect+/−10% of the recited value. In addition, it is to be understood that any particular embodiment that falls within the prior art may be explicitly excluded from any one or more of the claims. Since such embodiments are deemed to be known to one of ordinary skill in the art, they may be excluded even if the exclusion is not set forth explicitly herein.

What is claimed is:

1. A pick-resistant lock assembly comprising:

a housing having a main bore and a chamber including a plurality of channels holding a corresponding plurality of pin stacks each including a plurality of wafers;

a core having a keyway and a plurality of core openings configured to align with the channels of the housing, the core shaped to cause removal of one or more of the plurality of wafers from each one of the plurality of pin stacks when the core is rotated;

a sleeve having a sleeve bore to accept the core, the sleeve having a plurality of sleeve openings configured to align with the core openings and the channels, the sleeve configured to fit within the main bore; and a true key configured for insertion into the keyway to rotate the core and the sleeve together for actuation of the lock assembly, wherein the pin stacks are configured to (i) provide a true shear line between the sleeve and the main bore which is generated by insertion of the true key into the keyway to rotate the core and sleeve together for actuation of the lock assembly, and (ii) provide a plurality of decoy shear lines between the core and the sleeve which block rotation of the sleeve and prevent actuation of the lock assembly, and wherein the plurality of wafers in each pin stack of the plurality of pin stacks includes a shear wafer having a different shape or a different height dimension than remaining wafers of the plurality of wafers, wherein the true shear line is provided when the shear wafer is removed from the pin stack upon rotation of the core.

2. The lock assembly of claim 1, wherein the core is shaped to include at least one wafer receiver adjacent to one or more of the core openings, the wafer receiver configured to remove the one or more of the plurality of wafers from a corresponding pin stack of the plurality of pin stacks.

3. The lock assembly of claim 2, wherein the at least one wafer receiver is a plurality of wafer receivers located adjacent to each core opening of the plurality of core openings.

4. The lock assembly of claim 3, wherein the plurality of wafer receivers are located on each side of the core openings.

5. The lock assembly of claim 4, wherein the wafer receivers are laterally extending grooves formed directly adjacent to the core openings.

6. The lock assembly of claim 3, wherein the plurality of wafer receivers are shaped indentations spaced apart from the core openings, the shaped indentations configured to receive only the shear wafer.

7. The lock assembly of claim 6, wherein the shear wafer is shaped to have a protruding surface complementary to the shaped indentations.

8. The lock assembly of claim 7, wherein the protruding surface is conical.

9. The lock assembly of claim 1, wherein the plurality of channels is five channels holding five pin stacks.

10. The lock assembly of claim 1, wherein the plurality of pin stacks each includes six thin wafers, one shear wafer, and one key pin.

11. The lock assembly of claim 10, wherein the key pin is selected from a set of two key pins having different height dimensions.

12. The lock assembly of claim 1, wherein the true shear line places a top surface of the shear wafer at a level substantially equivalent to the level of the outer surface of the sleeve, thereby permitting rotation of the core and sleeve together.

13. The lock assembly of claim 1, wherein the core is defined by a lock pin groove at an end of the plurality of core openings, the lock pin groove separated from the keyway and having an inner cam surface permitting a lock pin residing in the lock pin groove to move out of the lock pin groove when full rotation of the sleeve is permitted.

14. A lock assembly comprising:

a housing having a main bore and a chamber including a plurality of channels holding a corresponding plurality of pin stacks;

a core having a keyway and having a plurality of core openings configured to align with the channels of the housing;

a sleeve having a sleeve bore to accept the core, the sleeve having a plurality of sleeve openings configured to align with the core openings and the channels, the sleeve configured to fit within the main bore; and a true key configured for insertion into the keyway to rotate the core and the sleeve together for actuation of the lock assembly;

wherein the pin stacks are each configured to provide (i) a plurality of decoy shear lines in which rotation of the core and the sleeve together is limited by a blocking position provided by the pin stacks, and (ii) a true shear line which permits rotation of the core and the sleeve together for actuation of the lock assembly when the true shear line is provided in each pin stack of the plurality of pin stacks, the true shear line provided by elevation of each pin stack of the plurality of pin stacks by the true key being inserted into the keyway, and wherein the at least one wafer receiver is a plurality of wafer receivers located adjacent to each core opening of the plurality of core openings.

15. The lock assembly of claim 14, wherein the plurality of pin stacks each includes a plurality of wafers and wherein the core is shaped to include at least one wafer receiver adjacent to at least some of the core openings, the wafer receiver configured to remove one or more of a plurality of wafers from a corresponding pin stack of the plurality of pin stacks when the core is rotated.

16. The lock assembly of claim 14, wherein the plurality of wafer receivers are located on each side of the core openings.

17. The lock assembly of claim 16, wherein the wafer receivers are laterally extending grooves formed directly adjacent to the core openings.

* * * * *